United States Patent
Roth et al.

(10) Patent No.: US 12,494,265 B2
(45) Date of Patent: Dec. 9, 2025

(54) ON-ACCESS ERROR CORRECTION FOR CONTENT-ADDRESSABLE MEMORY

(71) Applicant: HEWLETT PACKARD ENTERPRISE DEVELOPMENT LP, Spring, TX (US)

(72) Inventors: Ron M. Roth, Palo Alto, CA (US); Giacomo Pedretti, Milan (IT)

(73) Assignee: Hewlett Packard Enterprise Development LP, Spring, TX (US)

(*) Notice: Subject to any disclaimer, the term of this patent is extended or adjusted under 35 U.S.C. 154(b) by 92 days.

(21) Appl. No.: 18/645,939

(22) Filed: Apr. 25, 2024

(65) Prior Publication Data

US 2025/0201334 A1 Jun. 19, 2025

Related U.S. Application Data

(60) Provisional application No. 63/609,652, filed on Dec. 13, 2023.

(51) Int. Cl.
   *G11C 29/00* (2006.01)
   *G06F 17/16* (2006.01)
   *G11C 15/04* (2006.01)

(52) U.S. Cl.
   CPC ............ *G11C 29/785* (2013.01); *G06F 17/16* (2013.01); *G11C 15/04* (2013.01)

(58) Field of Classification Search
   CPC ....... G11C 29/785; G11C 15/04; G11C 29/42; G11C 8/08; G06F 17/16
   USPC ......................................... 365/185.09, 185.11
   See application file for complete search history.

(56) References Cited

U.S. PATENT DOCUMENTS

| | | | | |
|---|---|---|---|---|
| 5,499,382 A | * | 3/1996 | Nusinov | G06F 5/00 712/210 |
| 8,829,332 B1 | * | 9/2014 | Roizin | H10F 71/121 257/290 |
| 10,116,468 B1 | * | 10/2018 | Hormati | H04B 3/14 |
| 10,355,756 B2 | * | 7/2019 | Cronie | H04L 25/085 |

(Continued)

OTHER PUBLICATIONS

Garzón et al., "Approximate Content-Addressable Memories: A Review", MDPI, 2023, pp. 70-82.

(Continued)

*Primary Examiner* — Michael T Tran
(74) *Attorney, Agent, or Firm* — Hewlett Packard Enterprise Patent Department

(57) ABSTRACT

Examples of the presently disclosed technology provide a methodology for detecting and correcting errors in a summing content-addressable memory (Σ-CAM) while the Σ-CAM is performing a computational task (i.e., "on-access" error correction). The methodology involves adding redundancy columns to a Σ-CAM used to store a task-driven matrix (i.e., a matrix having values comporting with a computational task). Examples can leverage an encoder to compute redundancy values for the redundancy columns such that the Σ-CAM stores a codeword of a linear code (C) in each row. Examples also modify the linear code (C) used to compute redundancy values. Namely, examples modify the linear code (C) so that it includes the all-one vector. With this modification, a system of the presently disclosed technology can detect and correct errors in an output vector from a Σ-CAM based on this modified/particularized linear code (C).

20 Claims, 9 Drawing Sheets

200

Input: $a' \in \mathbb{B}^k$.

Output: $(a' \mid a'') \in \mathbb{B}^n$.

Let $\tilde{c} = (\tilde{c}_v)_{v \in [\tilde{n}]} \leftarrow E(a')$;

For each $v \in [\tilde{n}-k)$ do {
   If $\tilde{c}_{k+v} = 1$ then
      $\tilde{a}_v \leftarrow 1_m$;
   Else
      Set $\tilde{a}_v \in \mathbb{B}^m$ so that (8) holds;
}

Let $a'' \leftarrow (\tilde{a}_0 \mid \tilde{a}_1 \mid \ldots \mid \tilde{a}_{\tilde{n}-k-1})$.

Encoding mapping $\mathcal{E}_0 : a' \mapsto (a' \mid a'')$.

(56) References Cited

U.S. PATENT DOCUMENTS

| | | | |
|---|---|---|---|
| 10,545,821 B2 | 1/2020 | Roth et al. | |
| 10,721,106 B1* | 7/2020 | Hormati | H04L 25/03019 |
| 10,742,451 B2* | 8/2020 | Tajalli | H04L 25/0276 |
| 10,884,853 B2* | 1/2021 | Wu | G06F 11/1048 |
| 11,061,766 B2 | 7/2021 | Roth et al. | |
| 11,183,983 B2* | 11/2021 | Tajalli | H03F 3/45744 |
| 2005/0289295 A1* | 12/2005 | Shoham | G11C 15/00 |
| | | | 711/108 |
| 2012/0110411 A1* | 5/2012 | Cheung | G06F 11/106 |
| | | | 714/763 |
| 2012/0153300 A1* | 6/2012 | Lidow | H01L 23/535 |
| | | | 257/77 |
| 2016/0294414 A1* | 10/2016 | Driessen | G06F 21/55 |
| 2020/0311077 A1* | 10/2020 | Zhang | G06F 3/068 |
| 2021/0064455 A1* | 3/2021 | Akel | G11C 7/1006 |

OTHER PUBLICATIONS

Garzón et al., "Hamming Distance Tolerant Content-Addressable Memory (HD-CAM) for DNA Classification", IEEE, vol. 10, 2022, pp. 28080-28093.

Mao et al., "Experimentally validated memristive memory augmented neural network with efficient hashing and similarity search", Nature Communications, 2022, pp. 1-13.

\* cited by examiner

TRUTH TABLE OF THE FUNCTION $(x, y) \mapsto \top(x, y)$.

| $x \backslash y$ | * | 0 | 1 |
|---|---|---|---|
| * | 0 | 0 | 0 |
| 0 | 0 | 0 | 1 |
| 1 | 0 | 1 | 0 |

Input: $a' \in \mathbb{B}^k$.
Output: $(a' \mid a'') \in \mathbb{B}^n$.

Let $\tilde{c} = (\tilde{c}_v)_{v \in [\tilde{n}]} \leftarrow E(a')$;
For each $v \in [\tilde{n}-k]$ do {
  If $\tilde{c}_{k+v} = 1$ then
    $\tilde{a}_v \leftarrow \mathbf{1}_m$;
  Else
    Set $\tilde{a}_v \in \mathbb{B}^m$ so that (8) holds;
}
Let $a'' \leftarrow (\tilde{a}_0 \mid \tilde{a}_1 \mid \ldots \mid \tilde{a}_{\tilde{n}-k-1})$.

Encoding mapping $\mathcal{E}_0 : a' \mapsto (a' \mid a'')$.

FIG. 2

FIRST FEW ELEMENTS OF $\rho_m^+$, $z_m^*$, AND $q_m$, AND BI-SPANNERS OF $\{z_m^*\}^2$.

| $m$ | $\rho_m^+$ | $z_m^*$ | Bi-spanner of $\{z_m^*\}^2$ over $\mathbb{Z}$ | $q_m$ |
|---|---|---|---|---|
| 1 | 1 | 1 | {} | 1 |
| 2 | 2 | 2 | {1, 1} | 2 |
| 3 | 3 | 3 | {1, 1, 2} | 3 |
| 4 | 4 | 4 | {1, 1, 2, 2} | 6 |
| 5 | 6 | 7 | {-2, 1, 2, 3, 6} | 6 |
| 6 | 9 | 11 | {-3, 1, 2, 4, 6, 8} | 9 |
| 7 | 14 | 18 | {-6, 1, 2, 4, 5, 8, 16} | 16 |
| 8 | 21 | 28 | {-6, 1, 24, 58, 16, 18} | 24 |
| 9 | 31 | 46 | {-10, 1, 2, 4, 5, 8, 16, 24, 36} | 36 |
| 10 | 47 | 74 | {-10, 1, 2, 4, 5, 8, 16, 24, 36, 50} | |
| 11 | 70 | 115 | {-10, 1, 2, 4, 5, 8, 16, 24, 36, 56, 84} | |

FIG. 3

REPRESENTATION OF THE ELEMENTS OF $Z_3^2$ BY THE BY-SPANNER $(1\ 1\ 2)_*$

| $(\xi^{(i)}, \xi^{(j)})$ | $a^{(i)}$ | $a^{(j)}$ | $\theta$ |
|---|---|---|---|
| (0, 0) | 000 | 000 | *** |
| (1, 0) | 100 | 000 | 1** |
| (1, 1) | 100 | 010 | 10* |
| (2, 0) | 001 | 000 | **1 |
| (2, 1) | 001 | 100 | 0*1 |
| (2, 2) | 110 | 001 | 110 |

REPRESENTATION OF THE ELEMENTS OF $Z_5^2$ BY THE BI-SPANNER
(1 2 3 4).

| $(\xi(0),\xi(1))$ | $\theta$ |
|---|---|
| (0, 0) | **** |
| (1, 0) | 1*** |
| (1, 1) | 10*0 |
| (2, 0) | *1** |
| (2, 1) | 01** |

| $(\xi(0),\xi(1))$ | $\theta$ |
|---|---|
| (2, 2) | *100 |
| (3, 0) | **1* |
| (3, 1) | 0*1* |
| (3, 2) | *01* |
| (3, 3) | 001* |

| $(\xi(0),\xi(1))$ | $\theta$ |
|---|---|
| (4, 0) | ***1 |
| (4, 1) | 0**1 |
| (4, 2) | *0*1 |
| (4, 3) | **01 |
| (4, 4) | 10*0 |

ON-ACCESS ERROR CORRECTION FOR CONTENT-ADDRESSABLE MEMORY

CROSS REFERENCE TO RELATED APPLICATIONS

This application claims the priority benefit of U.S. Provisional Patent Application No. 63/609,652, filed on Dec. 13, 2023, the contents of which are incorporated herein by reference in their entirety.

BACKGROUND

Content addressable memory ("CAM") is a type of computing memory in which stored data is searched by content rather than location. When a "word" is input to a CAM, the CAM searches for the word in its contents. If the CAM finds the word (i.e., "returns a match"), the CAM returns the address of the location where the found word resides. Individual cells of a CAM (referred to herein as CAM cells) can be arranged into rows and columns to form the CAM. Depending on configuration, a respective row or column of a CAM that connects outputs from constituent CAM cells may be referred to as a match line.

A summing CAM ($\Sigma$-CAM) (sometimes referred to as Hamming-distance CAM) is a particular type of CAM configured to sum outputs from CAM cells arranged along a respective column. Said differently, a $\Sigma$-CAM may refer to a CAM which consists of an $\ell \times n$ array of CAM cells, with each CAM cell $(i,j) \in [\ell] \mathbb{B} \times [n]$ implementing the function $x \mapsto N(x, a_{i,j})$, for some internal state value $a_{i,j} \in$ ⟩. Programmed internals states of the $\Sigma$-CAM can be represented as an array (matrix) $A = \mathbb{B}^{\ell \times n} \in (a_{i,j})_{(i,j) \in [\ell] \times [n]}$, with $a_i$ standing for row i and $A_j (= (A)_{\{j\}})$ for column j. An input to the $\Sigma$-CAM may comprise a row vector (e.g., search key) $x = (x_i)_{i \in [\ell]} \in \mathbb{B}^\ell$, with $x_i$ serving as the input to all the CAM cells along row i. A respective column (corresponding to a match line) j of the $\Sigma$-CAM can compute an integer sum of the outputs of the CAM cells arranged along the respective column j—i.e., $c_j = \Sigma_{i \in [\ell]} N(x_i, a_{i,j}) = w(x - A_j)$. These integer sums form the output row vector—i.e., $c = (c_j)_{j \in [n]} \in$ [0: $\ell^n$—of the $\Sigma$-CAM. Accordingly, the $\Sigma$-CAM computes the Hamming distances between the input vector and the contents of the CAM cells along each of the n columns in the $\Sigma$-CAM.

BRIEF DESCRIPTION OF THE DRAWINGS

The present disclosure, in accordance with one or more various examples, is described in detail with reference to the following figures. The figures are provided for purposes of illustration only and merely depict examples.

FIG. 1 depicts an example truth table, in accordance with examples of the presently disclosed technology.

FIG. 2 depicts an encoding mapping algorithm, in accordance with examples of the presently disclosed technology.

FIG. 3 depicts an example table of values, in accordance with examples of the presently disclosed technology.

FIG. 4 depicts an example table of values, in accordance with examples of the presently disclosed technology.

FIG. 5 depicts an example table of values, in accordance with examples of the presently disclosed technology.

Figure 6:
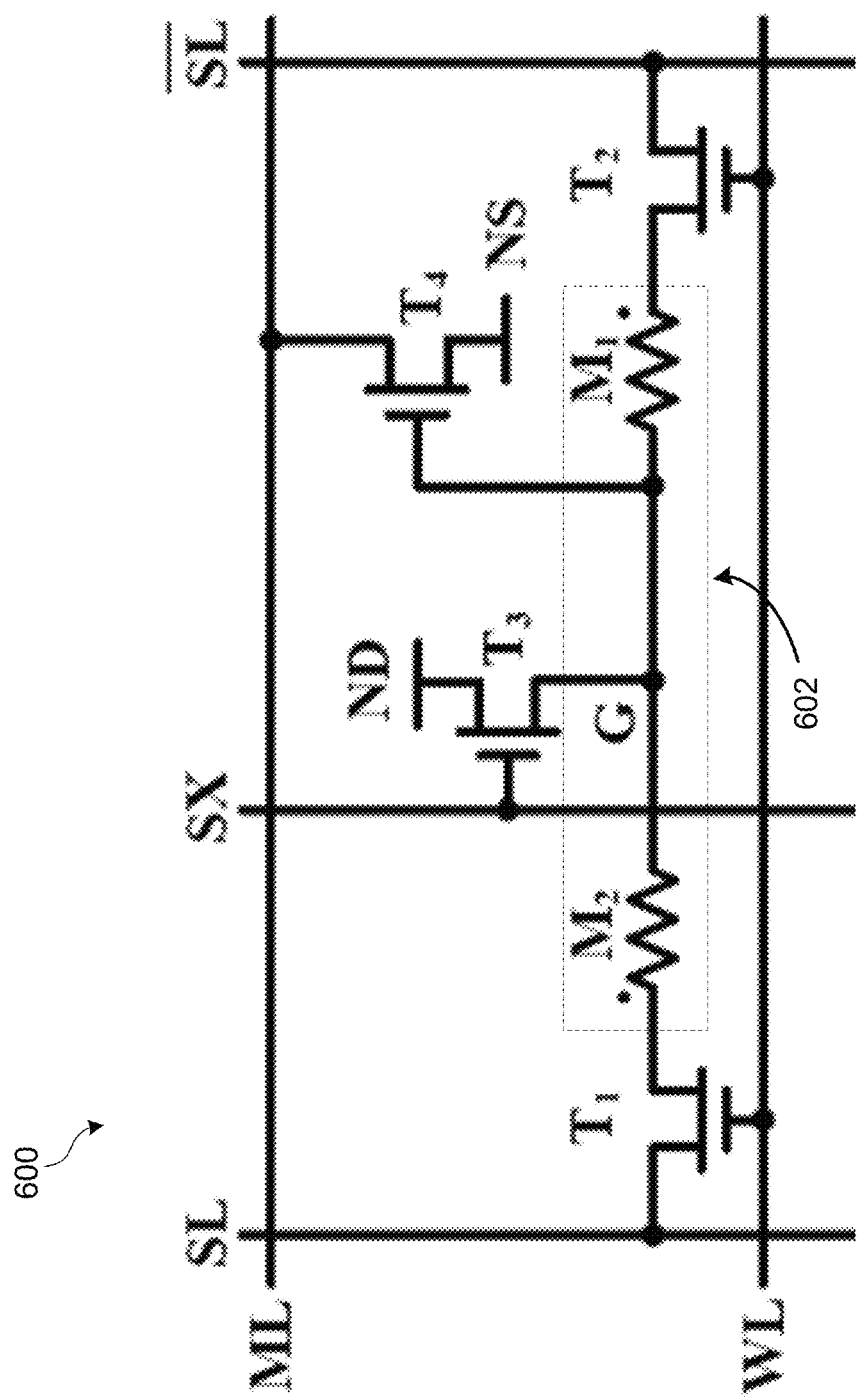
FIG. 6 depicts an example CAM cell, in accordance with examples of the presently disclosed technology.

The figures are not exhaustive and do not limit the present disclosure to the precise form disclosed.

DETAILED DESCRIPTION

Examples of the presently disclosed technology provide a methodology for detecting and correcting errors in a $\Sigma$-CAM while the $\Sigma$-CAM is performing a computational task (i.e., "on-access" error correction).

The presently disclosed "on-access" error correction methodology can improve upon "off-line" error detection/correction methodologies. Such "off-line" error detection/correction methodologies generally involve testing procedures which would disrupt normal operation of a hardware accelerator during a computational task, and thus must be performed "off-line." For example, an alternative methodology for detecting errors in a CAM could involve applying a sequence of test vectors to a CAM in order to detect programming and other circuit-based errors. Applying the test vectors may be unrelated to—and would otherwise disrupt—a computational task the CAM is being used to perform. Thus such a methodology would be performed "off-line." By contrast, the presently disclosed error detection and correction methodology involves correcting an output vector generated by a $\Sigma$-CAM while the $\Sigma$-CAM is performing a designated computational task. Accordingly, such a methodology may be more computationally efficient (i.e., consume less processing resources, time, power consumption, etc.) than alternative "off-line" error detection and correction methodologies.

Examples realize the advantages provided by "on-access" error detection and correction by leveraging an intelligent insight that a $\Sigma$-CAM operates analogously to a vector-matrix multiplier (sometimes referred to as a dot product engine). Leveraging such insight, examples uniquely adapt an error-correction methodology for vector-matrix multipliers for $\Sigma$-CAMs. The adapted methodology involves adding redundancy columns to a $\Sigma$-CAM already being used to store a task-driven matrix (i.e., a matrix having values comporting with a computational task). Examples can leverage one or more processing resources (e.g., an encoder) to compute redundancy values for the redundancy columns such that the $\Sigma$-CAM stores a codeword of a linear code (C) in each row. To further adapt the methodology for a new/particularized type of hardware accelerator—i.e., a $\Sigma$-CAM—examples modify the linear code (C) used to compute redundancy values. Namely, examples modify the linear code (C) so that it includes the all-one vector. With this modification, a system of the presently disclosed technology can detect and correct errors in an output vector from a $\Sigma$-CAM based on this modified/particularized linear code (C).

For example, a system of the presently disclosed technology may comprise: a) a $\Sigma$-CAM comprising CAM cells arranged into a number (l) rows and a number (n) columns, wherein the $\Sigma$-CAM is configured to sum outputs from a number (l) CAM cells connected along a respective column of the number (n) columns; and b) one or more processing resources operative to program the CAM cells to store a matrix (A) having dimensions (l×n), wherein: i) each row of the matrix (A) comprises a codeword of a linear code (C), and ii) the linear code (C) includes an all-one vector of dimension (n) as a codeword.

In the above-described system, CAM cells connected along a number (k) columns of the number (n) columns may comprise task-driven CAM cells. Relatedly, CAM cells connected along a number (n–k) columns of the number (n) columns may comprise redundancy CAM cells. Here, it follows that a respective row of the Σ-CAM comprises a number (k) task-driven CAM cells and a number (n–k) redundancy CAM cells. Accordingly, programming the Σ-CAM to store the matrix (A) having dimensions (l×n) may comprise: a) programming the number (k) task-driven CAM cells of the respective row to store task-driven values comporting with a computational task; b) computing redundancy values for the number (n–k) redundancy CAM cells of the respective row based on the programmed task-driven values and the linear code (C); and c) programming the number (n–k) redundancy CAM cells of the respective row to store the computed redundancy values such that the respective row stores a codeword of the linear code (C). In certain implementations, computing the redundancy values for the number (n–k) redundancy CAM cells of the respective row may comprise computing the redundancy values for the number (n–k) redundancy CAM cells of the respective row such that the task-driven values and the redundancy values include a sequence of ones and zeros prescribed by the linear code (C).

In the above-described system, the one or more processing resources may be further operative to detect and correct one or more errors in an output vector (c) from the Σ-CAM based on the linear code (C). In certain of these implementations, the output vector (c) may have dimension (n). Relatedly, the output vector (c) may comprise a concatenation of a task-driven output vector (c') and a redundancy output vector (c"). Here, the task-driven output vector (c') may have dimension (k) and correspond to a summation between: (1) a vector-matrix multiplication between a transformation of an input vector (x) of dimension (l) received by the Σ-CAM and a task-driven stored matrix (A') of dimension (l×k) stored by the task-driven CAM cells of the Σ-CAM; and (2) a vector multiplication between the all-one vector of dimension (n) and a constant value (see e.g., Eq. 4 below). Relatedly, the redundancy output vector (c") may have a dimension (n–k) and correspond to a summation between: (1) a vector-matrix multiplication between the transformation of the input vector (x) and a redundancy stored matrix (A") of dimension (l×(n–k)) stored by the redundancy CAM cells of the Σ-CAM; and (2) a vector multiplication between the all-one vector of dimension (n) and the constant value (see e.g., Eq. 4 below). Moreover, the one or more processing resources may detect and correct the one or more errors in the task-driven output vector (c') based on (e.g., by comparing) the linear code (C) and the redundancy output vector (c").

In some implementations of the above-described system, a respective CAM cell of the Σ-CAM may comprise one or more programmable memristors. Here, programming the respective CAM cell may comprise programming conductance of the one or more programmable memristors.

Examples of the presently disclosed technology will now be described in greater detail below. It should be understood that the description below merely provides illustrative examples, and should not limit the principles disclosed herein.

Herein, several coding schemes are presented for on-access correction of error Σ-CAMs. Such schemes can apply to binary Σ-CAMs (sometimes referred to herein a Σ-BCAMs) and ternary Σ-CAMs (sometimes referred to herein a Σ-TCAMs). Various schemes entail allocating rows of a Σ-CAM for redundancy such that, when an input vector is applied to the Σ-CAM, errors in the output vector can be corrected, provided that their number (measured by either the Hamming metric or an $L_1$-metric) does not exceed a prescribed value. In the case of Σ-BCAMs, the operation of the Σ-BCAM resembles that of a discrete vector-matrix (V-M) multiplier. Accordingly, error-correction schemes of the presently disclosed technology for Σ-BCAMs build upon schemes that have been proposed for such multipliers. Adaption of such schemes to Σ-TCAMs can be more involved due to the wildcard symbol (sometimes referred to as a "don't care" symbol). Accordingly, schemes of the presently disclosed technology for Σ-TCAMs make use of a special type of a positional binary representation of integer pairs where the representations of the two integers in any pair do not share a 1 in the same position.

Examples of the presently disclosed technology are described in greater detail in conjunction Sections I-VIII below.

Section I. Introduction of Notation

Hereafter, the present application uses the following notation. For $y,z \in \mathbb{Z}$, the application denotes by [y:z] the integer subset $\{x \in \mathbb{Z} : y \leq x \leq z\}$ and by [y:z⟩ the set [y:z–1]. The application will use the shorthand notation [z⟩ for [0:z⟩ and $\mathbb{B}$ for [2⟩ . For an integer vector x, the application denotes its Hamming weight and $L_1$-norm by w(x) and $\|x\|$, respectively. For an $\ell \times n$ matrix A (or a row n-vector if $\ell = 1$) and a subset $X \subseteq [n\rangle$, the application lets $(A)_x$ denote the $\ell \times |X|$ submatrix of A that is formed by the columns that are indexed by X. For $y,z \in \mathbb{Z}$] such that z>0, the notation y MOD z stands for the remainder in [z⟩ when y is divided by z. The ring of integers modulo q will be denoted by $\mathbb{Z}_q$.

Let N: $\mathbb{B} \times \mathbb{B} \to \mathbb{B}$ B be the inequality-test (XOR) function, which is defined for every $x, a \in \mathbb{B}$ by $$N(x, a) = [\![ x \neq a ]\!] = \begin{cases} 1 & \text{if } x \neq a \\ 0 & \text{otherwise} \end{cases}, \qquad \text{Eq. 1}$$

where $[\![ \Omega ]\!]$ denotes the Iverson bracket (which evaluates to 1 if its argument is true, and to 0 otherwise). As described above, a Σ-CAM ma refer to a device which consists of an $\ell \times n$ array of CAM cells, with each CAM cell $(i,j) \in [\ell\rangle \times [n\rangle$ implementing the function $x \mapsto N(x, a_{i,j})$, for some internal state value $a_{i,j} \in \mathbb{B}$. This application represents the internal states as an array (matrix) $A = (a_{i,j})_{(i,j) \in [l\rangle \times [n\rangle} \in \mathbb{B}^{\ell \times n}$, with $a_i$ standing for row i and $A_j (= (A)_{\{j\}})$ for column j. The input to the Σ-CAM may comprise a row vector (e.g., "search key") $x = (x_i)_{i \in [\ell\rangle} \in \mathbb{B}^\ell$, with $x_i$ serving as the input to all the CAM cells along row i. Each column (corresponding to a match line) j in the Σ-CAM computes an integer sum of the outputs of the CAM cells along the column, $$c_j = \sum_{i \in [\ell\rangle} N(x_i, a_{i,j}) = w(x - A_j). \qquad \text{Eq. 2}$$

These integer sums form the output row vector, c= $(c_j)_{j\in[n]} \in [0:\ell\ ^n$, of the Σ-CAM. Accordingly, a Σ-CAM computes the Hamming distances between an input vector and the contents of the CAM cells along each of the n columns in the Σ-CAM.

Hereafter, the application uses the notation S(x,A) for the vector in $[0:\ell\ ^n$ whose entries are given by the right-hand side of Eq. 2. Namely, S(x,A) is the result c of the computation when an input vector x is applied to a Σ-CAM that is programmed to a matrix A of internal states. The zero entries in c=S(x,A) are referred to as "matches," and an ordinary binary CAM (BCAM) can be seen as a quantized Σ-CAM whose output is the binary n-vector ($[\![c_j=0]\!])_{j\in[n]}$ (which points at the columns where matches occur).

The Σ-CAM serves as a model for accelerators that have been proposed for computing the Hamming distance in various applications, and there are several designs for their CAM cells (using CMOS as well as resistive technologies) and for the circuitry that computes the Hamming distance along each column. In those designs, a value $N(x_i, a_{i,j})=1$ is typically realized by setting CAM cell (i,j) to some high conductance. When $N(x_i, a_{i,j})=0$, the CAM cell is virtually open (i.e., has zero conductance). One method for obtaining the Hamming distance is by fixing the voltage level of the match lines and measuring the current that flows through each column of the CAM. This current is generally proportional to the number of high-conductance CAM cells along the column. In various applications of interest, the matrix λ is modified much less frequently than the input vector x.

Inaccuracies while programming CAM cells, manufacturing defects, and noise while reading an output vector are examples of factors that may cause the actually-read row vector, $y=(y_j)_{j\in[n]} \in \mathbb{Z}_{\geq 0}^n$, to differ from the correct vector c=S(x,A). The error vector can be defined as the following vector in $\mathbb{Z}^n$:

$$e = (e_j)_{j\in[n]} = y - c$$

In a scenario where a faulty CAM cell generates the wrong output, yet that output is still in B, the output at the column that contains this CAM cell will be a change by ±1. This application will refer to such an event as an $L_1$-error. The $L_1$-norm $\|e\|$ then bounds from below the number of $L_1$-errors, with equality attained if all the faulty CAM cells along the same column err at the same direction. A focus in this application will be on this scenario, in which case one of the presently disclosed design parameters will be the largest $L_1$-norm τ of e that can be tolerated, which—when presuming nothing about the internal states in the matrix A—can serve as a proxy for the largest number r or faulty CAM cells that can be tolerated. However, this application will also consider the scenario where a faulty CAM cell may have a larger effect on the output of the column, in which case r will stand for the largest Hamming weight of e that can be tolerated. Hereafter, by "a number of errors" this application may refer to either $\|e\|$ or w(e), depending on the context.

An aim of the presently disclosed technology is providing coding schemes for on-access error correction in Σ-CAMs (and in a variant thereof to be presented below). To this end, the presently disclosed technology adapts a framework for integer vector-matrix (V-M) multipliers to Σ-CAMs, since there is a close relationship between the functions of these two devices. Specifically, it can be seen from Eq. 2 that $$S(x, A) = \sum_{i:x_i=0} a_i + \sum_{i:x_i=1}(1_n - a_i), \qquad \text{Eq. 3}$$

where $1_n$ stands for the all-one row n-vector. It follows that $$S(x, A) = \underbrace{(1_\ell - 2x)A}_{u} + w(x)\cdot 1_n, \qquad \text{Eq. 4}$$

where $u \in \{\pm 1\}^\ell$.

Namely, up to an additive multiple of the all-one vector, the Σ-CAM performs a multiplication of a vector in $\{\pm 1\}^\ell$ by a matrix in $\mathbb{B}^{\ell \times n}$.

With this in mind, examples of the presently disclosed technology program the matrix A so that the first k(<n) entries in c=S(x,A) will carry the target computation of the Σ-CAM, while the remaining n−k entries of c will contain redundancy symbols, which can be used to detect or correct computational errors. Thus, the programmed $\ell \times n$ matrix A will have the structure $$A = (A' \mid A''), \qquad \text{Eq. 5}$$

where $A'=(A)_{[k]}$ and $A''=(A)_{[k:n]}$. The computed row vector for an input vector $x \in \mathbb{B}^\ell$ will then be c=S(x,A'')=(c'|c''), where $c'=(c)_{|k]} =S(x, A')$ is the target computation while $c''=(c)_{[k:n]} =S(x,A'')$ is the redundancy portion.

Given positive integer $\ell$, n, and k<n, a Σ-CAM coding scheme is a pair (ε,$\mathcal{D}$), where ε:$\mathbb{B}^{\ell \times k} \to \mathbb{B}^{\ell \times n}$ is an encoding mapping such that for every $A' \in \mathbb{B}^{\ell \times k}$, the image A=ε(A') has the form of Eq. 5 for some $A'' \in \mathbb{B}^{\ell \times (n-k)}$, and $\mathcal{D}$ :$[0:\ell\ \to [0:\ell\ ^k \cup \{\text{"e"}\}$ is a decoding mapping (where "e" designates decoding failure).

The set $$C = C(\mathcal{E}) = \{S(x, \mathcal{E}(A')): A' \in \mathbb{B}^{\ell \times k}, x \in \mathbb{B}^\ell\}$$

is the code induced by $\mathcal{E}$ and its members are called codewords. Namely, $\mathcal{C} \subseteq [0:\ell\ ^n$ and its codewords are all the possible output vectors that can be obtained when A' ranges over all possible $\ell \times k$ matrices over $\mathbb{B}$ and x ranges over all possible $2^\ell$ input vectors in $\mathbb{B}^\ell$. This application will refer to n and k as the length and dimension, respectively, of the coding scheme. For row vectors $z \in \mathbb{Z}^n$ that arise in connection with a coding scheme, this application uses the notation z' and z'' for their k-prefix $(z)_{[k]}$ and (n−k)-suffix $(z)_{[n-k]}$), respectively. This notational convention extends to $\ell \times n$ matrices as well.

Given $\ell$, k, and a prescribed number of error τ (measured by either the $L_1$-metric or the Hamming metric) a goal is to have a coding scheme ($\mathcal{E}$, $\mathcal{D}$) with the smallest possible n such that for every $A' \in \mathbb{B}^{\ell \times k}$ and $x \in \mathbb{B}^\ell$, the k-prefix, c', of the respective codeword c=S(x,$\mathcal{E}$ (A'))=(c'|c'') in $\mathcal{C}$ can be recovered correctly in the presence of $\tau$ errors or less. Namely, the following equality may hold for every read vector $y \in [0:\ell]^n$ such that $\|y-c\| \leq \tau$:

$$\mathcal{D}(y) = c' (= S(x, A'))$$

(alternatively, n can be given and k is to be maximized). Note that the decoding mapping D is may not be required to recover the redundancy part c".

More generally, given nonnegative integer $\tau$ and $\sigma$, a coding scheme $(\mathcal{E}, D)$ is said to correct $\tau$ errors and detect $\tau+\sigma$ errors (in the $L_1$-metric or the Hamming metric) if the following conditions hold for every computed output vector $c = S(x,A) \in \mathcal{C}$ and the respective read vector $y \in [0:\ell]^n$.

If $|y-c| \leq \tau$ then $D(y) = c'$.
Otherwise, if $\|y-c\| \leq \tau+\sigma$ then $D(y) \in \{c', \text{"e"}\}$.

The minimum distance of $\mathcal{C}$ denoted $d(\mathcal{C})$, is defined as the smallest $L_1$/Hamming distance between any two codewords in C having distinct k-prefixes:

$$d(C) = \min_{\substack{c_1, c_2 \in C: \\ c_1' \neq c_2'}} \|c_1 - c_2\|$$

The following result provides further details.

Proposition 1. Let $\varepsilon: \mathbb{B}^{\ell \times k} \to \mathbb{B}^{\ell \times n}$ be an encoding mapping and let $\tau$ and $\sigma$ be nonnegative integers such that $$2\tau + \sigma < d(C(\varepsilon))$$

Then there exists a decoding mapping $D:[0:\ell]^n \to [0:\ell]^k \cup \{\text{"e"}\}$ such that the coding scheme $(\mathcal{E}, D)$ can correct $\tau$ errors and detect $\tau+\sigma$ errors.

Unless otherwise stated, $\varepsilon$ will be separable, namely, for each row index $\ell) i \in [\ell)$, the contents of row i in $\varepsilon(A')$ will only be a function of row i in A'(and not of the rest of the rows in A'), will be the same for all i, and will not depend on $\ell$. In case of separable encoders, this application assumes that the domain and range of $\varepsilon$ are $\mathbb{B}^k$ and $\mathbb{B}^n$, respectively.

Let $\text{Im}(\varepsilon) \subseteq \mathbb{B}^n$ be the set of all images of (a separable)$\mathcal{E}$. It follows from Eq. 3 (or Eq. 4) that $$C = \left\{ \sum_{i \in [\ell)} b_i \cdot c_i + b \cdot \mathbf{1}_n : c_i \in \text{Im}(\varepsilon), \right.$$

$$\left. b_i \in \mathbb{Z}, b \in [0:\ell], \sum_{i \in [\ell)} |b_i| \leq \ell, \text{ and } \sum_{i \in [\ell)} b_i = \ell - 2b \right\}.$$

In particular, $\ell \cdot c \in \mathcal{C}$ for every $c \in \text{Im}(\mathcal{E})$, and $\ell/2) \cdot \mathbf{1}_n \in \mathcal{C}$ when $\ell$ is even. Accordingly, examples leverage coding schemes $(\varepsilon, \mathcal{D})$, for which $\text{Im}(\mathcal{E})$ is a subset of (the intersection of $\mathbb{B}^n$ with) an ambient module $\mathcal{M} \subseteq \mathbb{Z}^n$ over $\mathbb{Z}$ that contains $\mathbf{1}_n$ and, in addition, satisfie $2\tau+\sigma < d(\mathcal{M})$, so that a fortiori $2\tau+\sigma < d(\mathcal{C}(\mathcal{E}))$. For simplicity, this application will generally assume hereafter that $\sigma = 0$.

Such coding schemes can be obtained through modifications of the constructions for vector-matrix multipliers for the special case where the matrix is over $\mathbb{B}$. Those modifications may require some mild conditions on the length n, but otherwise incur no penalty in the redundancy. This application will start by describing in Section II the scheme which results from a modification of a Hamming-metric construction for vector-matrix multipliers. As a general construction, this construction is perhaps the simplest, and it fits both the $L_1$-metric and the Hamming metric. Other (yet more complex) constructions exist for the $L_1$-metric when $\tau$ is sufficiently small compared to n. This application discusses those constructions in Sections VI and VII.

In Section III (and continuing in subsequent sections as well), this application will consider a variant of $\Sigma$-CAMs that is based on cells of a ternary content-addressable memory (TCAM). TCAMs are extensions of ordinary binary CAMs where the internal state value of a CAM cell and the input to the CAM cell are allowed to take a third "wildcard" symbol * (sometimes referred to as a "don't care," or "always match" symbol). Thus, the input and state alphabets of the CAM cells are both $\mathbb{B}_* = \mathbb{B} \cup \{*\}$, and each CAM cell implements the function $T: \mathbb{B}_* \times \mathbb{B}_* \to \mathbb{B}$ defined in truth 100 of FIG. 1 (the restriction of the truth table 100 to its last two rows and columns coincides with the function $N(\cdot,\cdot)$ in Eq. 1).

The introduction of the symbol wildcard * impacts the presently disclosed coding schemes in a nontrivial way. In particular, examples leverage a special type of a positional binary representation of integer pairs where the representations of the two integers in any pair do not share a 1 in the same position. Such representations, which this application refers to as bi-spanners, may be of an independent interest and their properties will be presented in Section IV. Compared to $\Sigma$-CAMs, the presently disclosed constructions for $\Sigma$-TCAMs incur an increase of the redundancy by roughly 60%.

This application will conclude with a discussion in Section VIII.

II. Construction Based on Hamming-Metric Codes

This applications presents a (separable) construction for vector-matrix multipliers with a modification for $\Sigma$-CAMs. For the purpose of this construction, the set of allowable error patterns is characterized by two parameters: the largest number $\tau_c$ columns in A that contain faulty CAM cells, and the largest number r, of $L_1$-errors per column ("inner errors"). Namely, $\tau_c$ and $\tau_i$ bound from above—respectively—the Hamming weight and the $L_\infty$-norm of the error vector e. Thus, $(\tau_c, \tau_i) = (\tau, 1)$ corresponds to the case where up to $\tau$ $L_1$-errors can occur, yet with at most one such error occurring per column. Taking $(\tau_c, \tau_i) = (\tau, n)$ will subsume the case where the overall number of $L_1$-errors is at most $\tau$. Finally, taking $(\tau_c, \tau_i) = (\tau, n)$ will correspond to the Hamming metric, where at most $\tau$ columns may be erroneous, without any further assumptions on the number of $L_1$-errors per column.

Given the number of columns n, an upper bound $\tau_c$ on the number of erroneous columns, and an upper bound $\tau_i$ on the number of $L_1$-errors per column, let $p > 2\tau_i$ be an odd prime and let $m = \lceil \log_2 p \rceil$. Examples select a respective Hamming-metric linear $\tau_c$-error-correcting $[\tilde{n}, k]$ code C over $\mathbb{Z}_p$, which is assumed to satisfy the following three conditions.

a) It contains the all-one codeword.
b) It is systematic, i.e., there is a one-to-one mapping E: $\mathbb{Z}_p^k \to C$ such that for every $u \in \mathbb{Z}_p^k$, the image E(u) has u as its k-prefix.

c) It has an efficient bounded-distance decoder $D: \mathbb{Z}_p^{\tilde{n}} \to \mathbb{Z}_p^{\tilde{n}}$: for a received word $\tilde{y} \in \mathbb{Z}_p^{\tilde{n}}$, the decoder returns the true error vector $\tilde{e} \in \mathbb{Z}_p^{\tilde{n}}$, provided that $w(\tilde{e}) \leq \tau_c$.

The parameters n and ñ are related by $$n = k + m(\tilde{n} - k).$$

This application next describes the (separable) encoder, $\mathcal{E}_0: \mathbb{B}^k \to \mathbb{B}^n$, of the proposed coding scheme through its action on a given row $a' \in \mathbb{B}^k$. Regarding a' as a vector in $\mathbb{Z}_p^k$, it is first extended b the systematic encoder for C into a codeword $$E(a') = \tilde{c} = (\tilde{c}_v)_{v \in [\tilde{n}]}, \qquad \text{Eq. 6}$$

of C, where $(\tilde{c})_{[k]} = a'$. Now, in the next step of the construction for vector-matrix multipliers, for each $v \in [\tilde{n}-k]$, the redundancy symbol $\tilde{c}_{k+v} (\in \mathbb{Z}_p)$ can be expanded into its base-2 representation $\tilde{a}_v \in \mathbb{B}^m$, i.e., $$\tilde{c}_{k+v} = \tilde{a}_v \cdot \omega_m^T, \qquad \text{Eq. 7}$$

where $$\omega_m = (1 \; 2 \; 2^2 \; \ldots \; 2^{m-1}).$$

Here, instead of Eq. 7, examples set the representation $\tilde{a}_v$ to be a vector in $\mathbb{B}^m$ so that $$((2^m - 2) \cdot \tilde{c}_{k+v}) \bmod p = \tilde{a}_v \cdot \omega_m'^T, \qquad \text{Eq. 8}$$

where $\omega_m'$ is obtained from $\omega_m$ by changing its last entry into $2^{m-1} - 1$. Since $(2^m - 2)/2 < p \neq 2^m - 2$, the multiplier $2^m - 2$ in Eq. 8 is invertible modulo p. Since $p \leq 2^m - 1$, the expansion in Eq. 8 is indeed always possible (sometimes with two different representing m-vector $\tilde{a}_v$). Moreover, for $\tilde{c}_{k+v} = 1$ examples can take $\tilde{a}_v = 1_m$ (which will be the selection even if another representation is possible).

Finally, as with vector-matrix multipliers, the image of a' under $\mathcal{E}_0$ is defined as:

$$\mathcal{E}_0(a') = a = (a' \mid a''),$$

where $$a'' = (a)_{[k:\tilde{n}]} = (\tilde{a}_0 \mid \tilde{a}_1 \mid \ldots \mid \tilde{a}_{\tilde{n}-k-1}).$$

The encoding mapping algorithm 200 of FIG. 2 summarizes the encoding process of a typical row in the Σ-CAM. It can be seen that $\mathcal{E}_0(1_k) = 1_n$ and that the linear span of Im ($\mathcal{E}_0$) over $\mathbb{Z}$ is a module $\mathcal{M} \subseteq \mathbb{Z}^n$ over $\mathbb{Z}$. To see the properties of this module, define $\lambda: \mathbb{Z}^n \to \mathbb{Z}_p^{\tilde{n}}$ to each vector $$y = (y' \mid \tilde{y}_0 \mid \tilde{y}_1 \mid \ldots \mid \tilde{y}_{\tilde{n}-k-1}) \in \mathbb{Z}^n$$

where $y' = (y)_{[k]}$ and $\tilde{y}_v = (y)_{[k+vm:k+(v+1)m]}$ ($\in \mathbb{Z}^m$), to the following image $\lambda(y) = \tilde{y} \in \mathbb{Z}_p^{\tilde{n}}$:

$$(\tilde{y})_{[k]} = y' \bmod p$$
$$(\tilde{y})_{[k:\tilde{n}]} = (2^m - 2)^{-1} \cdot (\tilde{y}_v \cdot \hat{\omega}_m^T)_{v \in [\tilde{n}-k]} \bmod p$$

(where the MOD p operation is applied component-wise). $\lambda$ is a homomorphism and it map $\mathcal{M}$ to C. This, in turn, implies that examples can decode (efficiently) any $\tilde{y} = \lambda(y)$ into the correct codeword in C, provided that the number of erroneous symbols in y (and therefore in $\tilde{y}$) does not exceed $\tau_c$. Furthermore, if the number of $L_1$-errors in each entry of y' does not exceed $\tau_i$, then, from the inequality $p > 2\tau_i$, examples can correct all these errors.

Specializing to the case where C is a normalized extended primitive BCH code over $\mathbb{Z}_p$ it satisfies conditions a)-c) above, and so do certain shortenings of it. The redundancy that examples obtain is bounded from above by $$n - k \leq \left(1 + \left\lfloor \frac{p-1}{p} \cdot 2\tau_c \right\rfloor \cdot \lceil \log_p \tilde{n} \rceil \right) \cdot \lceil \log_2 p \rceil$$

with equality holding when $\tau_c \ll \tilde{n}$ (which is a regime of interest). Since $\lceil \log_p \tilde{n} \rceil < 1 + \log_p n$, the redundancy behaves like $$\frac{\lceil \log_2 p \rceil}{\log_2 p} \cdot \left\lfloor \frac{p-1}{p} \cdot 2\tau_c \right\rfloor \cdot \log_2 n + O(\tau_c), \qquad \text{Eq. 9}$$

(where the constant multiplier in the $O(\tau_c)$ term is proportional to $\log_2 \approx \log_2 \tau_i$).

Example 17

For the case $\tau_i = 1$, where at most one $L_1$-error is tolerated per column, examples take p=3. Accordingly, $$n - k = \frac{2}{\log_2 3} \cdot \left\lfloor \frac{4\tau_c}{3} \right\rfloor \cdot \log_2 n + O(\tau_c) \approx 1.68 \cdot \tau_c \cdot \log_2 n.$$

In particular, for $\tau_c = 1$ examples get $n - k = (2/\log_2 3) \log_2 n + O(1) \approx 1.26 \log_2 n$, and twice as much (i.e., $2.52 \log_2 n$) when $\tau_c = 2$. Yet for $\tau_c = 2$ examples can do better by replacing the BCH codes with Preparata codes, which are linear over $\mathbb{Z}_4$. The redundancy thus obtained is only $2 \log_2 n$. Examples may get a similar redundancy also with the construction of Section VI, with the additional benefit that the two $L_1$-errors may also occur in the same column of the array.

Example 2

For the case $\tau_i=2$ examples can take p=5, in which case examples get the following approximation of the ratio between the redundancy and $\tau_c \cdot \log_2 n$:

$$\frac{n-k}{\tau_c \cdot \log_2 n} \approx \frac{24}{5\log_2 5} \approx 2.07$$

However, due to the rounding-up in the $\lceil \log_2 p \rceil$ term in Eq. 9, examples will get a smaller redundancy if examples select p=7:

$$\frac{n-k}{\tau_c \cdot \log_2 n} \approx \frac{36}{7\log_2 7} \approx 1.83$$

For large $\tau_i$, the (p−1)/p term in Eq. 9 becomes practically 1 and the expression for the redundancy becomes approximately $(2\tau_c-1) \cdot \log_2 n$.

Recall that a normalized extended primitive BCH code C over $\mathbb{Z}_p$, which has length $\tilde{n}=p^h$ for some $h \in \mathbb{Z}^+$, contains the all-one codeword and so it satisfies condition a). This condition also holds for any code that is obtained by shortening C on the zero entries of any nonzero codeword of C (possibly after re-scaling of the coordinates). For example, for any proper divisor $s > 2\tau_c$ of $p^h-1$, the code C contains $t=(p^h-1)/s$ codewords $c_i$, $i \in [t]$, each of Hamming weight s+1, whose supports overlap only on the coordinate that corresponds to the code locator 0. Moreover, all their other nonzero entries are 1. Thus, for any $w \in [0:t]$, the Hamming weight of the codeword $\sum_{i \in [w]} c_i$ of C is either s·w (if p divides w) or s·w+1 (otherwise). Namely, examples can achieve all these code lengths by shortening C while satisfying condition a). For the practical range of parameters, $p^h-1$ examples have sufficiently many divisors (in particular, it is always divisible by 2 and p−1). For instance, when $\tau_i=1$ examples can take p=3. In this case the values for h=4,5,6 are, respectively, $80=2^4 \cdot 5$, $242=2 \cdot 11^2$, and $728=2^3 \cdot 7 \cdot 13$. Or when $\tau_i=2$, examples can take p=5, in which case $5^4-1=624=2^4 \cdot 3 \cdot 13$.

III. Extension to F-TCAMs

This section describes the on-access error correction problem in Σ-TCAMs, namely, Σ-CAMs that are based on TCAM cells (i.e., a particular type of CAM cell). If an entry $x_i$ of the input vector $x=(x_i)_{i \in [\ell]}$ is the wild card symbol * then the TCAM cells along row i in the Σ-TCAM will produce the all-zero vector and therefore will not affect the output vector. Therefore, in the discussion that follows, it can be assumed that the input vector x is in $\mathbb{B}^\ell$.

For $i \in [\ell]$, this application uses the notation $\theta_i = (\vartheta_{i,j})_{j \in [n]}$ for the internal state vector (over $\mathbb{B}^n_*$) in an $\ell \times n$ Σ-TCAM. For $x \in \mathbb{B}_*$, this applications lets $a_i^{(x)} = \left(a_{i,j}^{(x)}\right)_{j \in [n]}$ denote the vector in $\mathbb{B}^n$ whose entries are the outputs of the TCAM cells along row i when the input symbol is x. Thus, $a_i^{(*)} \equiv 0$, and for $x \in \mathbb{B}$ and any $j \in [n]$:

$$a_{i,j}^{(x)} = T(x, \vartheta_{i,j}).$$

In short, $$a_i^{(x)} = T_n(x, \theta_i), \qquad \text{Eq. 10}$$

where $T_n(x, \theta_i) = \left(T(x, \vartheta_{i,j})\right)_{j \in [n]}$. Eq. 3 then becomes $$S(x, A) = \sum_{i \in [\ell]} a_i^{(x_i)} = \sum_{i: x_i = 0} a_i^{(0)} + \sum_{i: x_i = 1} a_i^{(1)}, \qquad \text{Eq. 11}$$

Note that due to the *-cells (i.e., CAM cells programmed to store wildcard symbols), the following relationship no longer holds: $a_i^{(1)} = 1_n - a_i^{(0)}$.

Eq. 11 suggests that a Σ-TCAM performs the following multiplication of a vector in $\mathbb{B}^{2\ell}$ by a $2\ell \times n$ matrix over $\mathbb{B}$:

$$(1_\ell - x | x) \binom{A^{(0)}}{A^{(1)}}, \qquad \text{Eq. 12}$$

where $A^{(0)}$ and $A^{(1)}$ are $\ell \times n$ matrices whose rows are $\left(a_i^{(0)}\right)_{i \in [\ell]}$ and $\left(a_i^{(1)}\right)_{i \in [\ell]}$, respectively. A caveat, however, is that the vectors $a_i^{(0)}$ and $a_i^{(1)}$ have to be non-intersecting, namely, they cannot have a 1 in the same position. Now, if examples apply a separable encoder $\mathcal{E}$ (non-intersecting) $(a^{(0)})'$, $(a^{(1)})' \in \mathbb{B}^k$, examples can end up with rows $$a^{(0)} = \left((a^{(0)})' | (a^{(0)})''\right) \text{ and } a^{(1)} = \left((a^{(1)})' | (a^{(1)})''\right)$$

that are intersecting on their redundancy parts $(a^{(0)})''$ and $(a^{(1)})''$. Thus, if the $\ell \times n$ array of TCAM cells is viewed as the $2\ell \times n$ matrix in Eq. 12, then coding schemes for Σ-TCAMs may not be separable per se. However, the dependence between the rows in the matrix may only be limited to pairs of rows—namely, $a^{(0)}$ and $a^{(1)}$—that correspond to the same row i of TCAM cells in the physical array. On the other hand, unlike the setting in Section II, since the relationship $a_i^{(1)} = 1_n - a_i^{(0)}$ no longer holds, examples can remove the requirement that the all-one vector be a codeword in (the ambient module $\mathcal{M}$ that contains) the induced code.

An adaption of a construction for vector-matrix multipliers to Σ-TCAMs may therefore differ from what was described in Section II. Specifically, examples let C, D, and E as defined therein, except that m will be selected differently below, and examples may no longer need condition a) (which required C to contain the all-one codeword). Given two vectors $(a^{(0)})'$, $(a^{(1)})' \in \mathbb{B}^k$ that represent the outputs of the first k cells along a given row in the Σ-TCAM (as in Eq. 10), examples can apply a systematic encoder for C as in Eq. 6 to both of them, $$E((a^{(0)})') = \tilde{c}^{(0)} \text{ and } E((a^{(1)})') = \tilde{c}^{(1)},$$

to produce codewords $\tilde{c}^{(0)}$ and $\tilde{c}^1$ of C. The expansion of Eq. 7 however, will be changed into $$\tilde{c}_{k+v}^{(x)} \equiv \tilde{a}_v^{(x)} \cdot \rho^\top \pmod{p}, x \in \mathbb{B}, \qquad \text{Eq. 13}$$

where $\tilde{a}_v^{(0)}$ and $\tilde{a}_v^{(1)}$ are non-intersecting in $\mathbb{B}^m$ and $\rho$ is a fixed integer vector in $\mathbb{Z}^m$ selected so that Eq. 13 can be satisfied for any arbitrary pair $(\tilde{c}_{k+v}^{(0)}, \tilde{c}_{k+v}^{(1)}) \in \mathbb{Z}_p^2$. A simple choice for such a vector $\rho$ is $$\rho = (\omega_{m'} | \omega_{m'}),$$

where $m' = \lceil \log_2 p \rceil$. Here $m = 2m' = 2\lceil \log_2 p \rceil$. Further, examples can select $\tilde{a}_v^{(0)}$ (respectively, $\tilde{a}_v^{(1)}$) so that its first (respectively, last) $m'$ entries are all zero. However, as described above the redundancy of the scheme is $n - k = m$ ($\tilde{n} - k$), which means that such a simple choice for $\rho$ may double the redundancy compared to the $\Sigma$-CAM construction of Section II. An aim is to do better than this simple solution and, to this end, examples introduce the following definition.

Let $\mathcal{G}$ an Abelian group and let $\mathcal{X}$ be a subset of $\mathcal{G} \times \mathcal{G}$. A bi-spanner of $\mathcal{X}$ over $\mathcal{G}$ is a multiset $\mathcal{R} = \{\rho_v\}_{v \in [m]}$ of elements of $\mathcal{G}$ such that for every pair $((\xi^{(0)}, \xi^{(1)}) \in \mathcal{X}$ there exist disjoint subsets $\mathcal{J}^{(0)}$ and $\mathcal{J}^{(1)}$ of $[m]$ such that $$\xi^{(0)} = \sum_{v \in \mathcal{J}^{(0)}} \rho_v \text{ and } \xi^{(1)} = \sum_{v \in \mathcal{J}^{(1)}} \rho_v, \qquad \text{Eq. 14}$$

Equivalently, writing $\mathcal{R}$ as a vector $\rho = (\rho_v)_{v \in [m]} \in \mathcal{G}^m$ there exist two non-intersecting vectors $a^{(0)}, a^{(1)} \in \mathbb{B}^m$ such that $$\xi^{(0)} = a^{(0)} \cdot \rho^\top \text{ and } \xi^{(1)} = a^{(1)} \cdot \rho^\top \qquad \text{Eq. 15}$$

The representation in Eq. 13 corresponds to the case where $\mathcal{G} = \mathbb{Z}_q$ and $\mathcal{X} = \mathbb{Z}_q^2 = \mathbb{Z}_q \times \mathbb{Z}_q$, where q is a prime p (but in the sequel examples will consider values q that are non necessarily prime). For $m \geq 2$, let $q_m$ be the largest integer such that $\mathbb{Z}_q^2$ has a bi-spanner of size m over $\mathbb{Z}_q$ for any $q \leq q_m$. The rightmost column in table 300 of FIG. 3 lists several values of $q_m$, which were found by an exhaustive computer search. For a given $q = p$, examples select m to be the smallest so that $q_m \leq q$, thus allowing examples to satisfy Eq. 13 for any $(\tilde{c}_{k+v}^{(0)}, \tilde{c}_{k+v}^{(1)}) \in \mathbb{Z}_q^2$. For the range of values of $q(>2)$ that is covered by table 300, it can be seen that such an m will be smaller than the simple choice/solution described above. Moreover, as shown in the next section, this in fact holds in general. Examples will use bi-spanners later on in other constructions as well.

Example 3

Referring to the parameters in Example 1, for $p = 3 = q_3$ examples can take $m = 3$ (while the simple construction would require taking $m = 2m' = 4$). The vector $\rho = (112)$ is bi-spanner of $\mathbb{Z}_3^2$ over $\mathbb{Z}_3$. Table 400 of FIG. 4 shows respective representations of the elements of $\mathbb{Z}_3^2$ (as in Eq. 15) and values for the contents of the TCAM cells (due to symmetry, it suffices to list only pairs $(\xi^{(0)}, \xi^{(1)})$ where $\xi^{(0)} \geq \xi^{(1)}$. The remaining pairs switch between $a^{(0)}$ and $a^{(1)}$ and, respectively, between 0 and 1 in $\theta$). Compared to the $\Sigma$-CAM construction in Example 1, where examples have taken $m = \lceil \log_2 3 \rceil = 2$, the $\Sigma$-TCAM construction incurs an increase of the redundancy by a factor of 3/2.

Example 4

Referring to the parameters in Example 2, if examples select $p = 5$ then, since $q_4 = 6$, examples can take $m = 4$ (instead of $m = 3$ in that example), in which case the redundancy for $\Sigma$-TCAMs will increase only by 4/3 compared to $\Sigma$-CAMs:

$$\frac{n - k}{\tau_c \cdot \log_2 n} \approx \frac{4}{3} \cdot \frac{24}{5 \log_2 5} \approx 2.76$$

The vector $\rho = (123)$ is a bi-spanner of $\mathbb{Z}_5^2$ over $\mathbb{Z}_5$, and table 500 of FIG. 5 shows the respective contents of the TCAM cells.

Interestingly, the savings that examples gained in Example 2 by selecting $p = 7$ therein does not propagate to $\Sigma$-TCAMs: for $p = 7$ examples now take $m = 5$, resulting in an increase by 5/3 of the redundancy compared to $\Sigma$-CAMs:

$$\frac{n - k}{\tau_c \cdot \log_2 n} \approx \frac{5}{3} \cdot \frac{36}{7 \log_2 7} \approx 3.05$$

IV. Properties of Bi-Spanners

In this section, the application presents certain properties of the sequence $(q_m)_m$ that was defined in Section III. In particular, the application shows that the sequence $(\log_2 q_m)/m$ converges to a limit which is greater than 0.622. Thus, a strategy of selecting m for a given $q = p$ to be the smallest so that $q_m \geq q$ yields a redundancy for $\Sigma$-TCAMs which is (asymptotically) less than $1/0.622 < 1.607$ times the respective redundancy for $\Sigma$-CAMs (while the simple approach referenced above doubles the redundancy).

The construction of bi-spanners for the case where $\mathcal{G} = \mathbb{Z}$ and $$\mathcal{X} = \mathcal{X}_r = \{(\xi^{(0)}, \xi^{(1)}) \in \mathbb{Z}_{\geq 0}^2 : \xi^{(0)} + \xi^{(1)} \leq r\}$$

for some positive inter r, may have an additional requirement that the entries of $\rho$ are all positive and that $\sum_{v \in [m]} \rho_v = \|\rho\| = r$. For any $(\xi^{(0)}, \xi^{(1)}) \in \mathcal{X}_r$ let $\xi^{(*)} = r - \xi^{(0)} - \xi^{(1)}$ and for disjoint subsets $\mathcal{J}^{(0)}, \mathcal{J}^{(1)} \subseteq [m]$ let $\mathcal{J}^{(*)} = [m] \setminus (\mathcal{J}^{(0)} \cup \mathcal{J}^{(1)})$. Under the condition $\|\rho\| = \tau$ examples can rewrite Eq. 14 as:

$$\xi^{(x)} = \sum_{v \in \mathcal{J}^{(x)}} \rho_v, \text{ for all } x \in \mathbb{B}_*, \qquad \text{Eq. 16}$$

Since $\max\{\xi^{(0)}, \xi^{(1)}, \xi^{(*)}\}$ can be as small as $\lceil r/3 \rceil$ and since $\rho$ is assumed to be all-positive, examples can deduce from Eq. 16 that $\rho_v \leq \lceil r/3 \rceil$ for every $v \in [m]$. In particular, $$\rho_{m-1} \leq 1 + \left\lfloor \frac{1}{2} \sum_{v \in [m-1)} \rho_v \right\rfloor, \qquad \text{Eq. 17}$$

Conversely, the infinite sequence $(\rho_m^+)_{m \geq 0}$ which starts with $\rho_0^+ = 1$ and satisfies Eq. 17 with equality for all $m > 1$ generates a sequence of integers $$r_m^+ = \sum_{v \in [m)} \rho_v^+, \, m \in \mathbb{Z}^+ \qquad \text{Eq. 19}$$

each being the largest $r \in \mathbb{Z}^+$ for which $\mathcal{X}_r$ has an all-positive bi-spanner $\rho$ of size $m$ such that $\|\rho\| = r$. From Eq. 17 (when stated with equality) and Eq. 18 examples get that $$\rho_m^+ = 1 + \lfloor r_m^+/2 \rfloor, \, m \in \mathbb{Z}^+,$$

and by induction on $m$ it readily follows that both $\rho_m^+$ and $r_m^+$ scale like $(3/2)^m$. Namely, the growth rate of these sequences is $$\lim_{m \to \infty} \frac{\log_2 \rho_m^+}{m} = \frac{\log_2 r_m^+}{m} = \log_2(3/2) \approx 0.585$$

Table 300 of FIG. 3 presents the first few values of $(\rho_m^+)_{m > 1}$.

Now, for any positive integer $q \geq \rho_m^+ = 1 + \lfloor r_m^+/2 \rfloor$, $r_m^+ \geq 2(q-1)$ and, so, any bi-spanner $\rho$ of $\mathcal{X}_{r_m^+}$ over $\mathbb{Z}$ (when taken modulo $q$ component wise) is also a bi-spanner of $\mathbb{Z}_q^2$ over $\mathbb{Z}_q$. Hence, $q_m \geq \rho_m^+$. In fact, examples can do better if $\rho$ may have negative entries as well, even if examples still require that the sum of the entries in $\rho$ equals $r$. Denoting by $r_m$ the largest integer $r \in \mathbb{Z}^+$ for which $\mathcal{X}_r$ has a bi-spanner $(\rho_v)_{v \in [m)} \in \mathbb{Z}^m$ such that $\sum_{v \in [m)} \rho_m = r$, examples have $r_m \geq r_m^+$, and the inequality is strict for large enough $m$ (see Proposition 2 and Eq. 22 below; for $m=6$ examples already have $r_6 \geq 19 > 17 = r_6^+$).

Examples can go one step further and look at bi-spanners of the set $[q]^2 = [q] \times [q]$ over $\mathbb{Z}$. Letting $z_m$ denote the largest integer $q$ for which $[q]^2$ has a bi-spanner of size $m$ over $\mathbb{Z}$, the sequences $(r_m)_m$ and $(z_m)_m$ are related by $$1 + \lfloor r_m/2 \rfloor \leq z_m \leq 1 + r_{m+1}, \qquad \text{Eq. 19}$$

Indeed, any bi-spanner of $\mathcal{X}_{2(q-1)}$ over $\mathbb{Z}$ is also a bi-spanner of $[q]^2$. Moreover, any bi-spanner of the latter is also a bi-spanner of $\mathcal{X}_{q-1}$ and can be made to sum to zero by adding at most one more element.

The sequence $(z_m)_m$ is non-decreasing and it is super-multiplicative, i.e., $$z_{m_1 + m_2} \geq z_{m_1} \cdot z_{m_2}, \qquad \text{Eq. 20}$$

for any $m_1, m_2 \in \mathbb{Z}^+$: if $\rho$ and $\tilde{\rho}$ are, respectively, bi-spanners of $[q]^2$ and $[\tilde{q}]^2$ over $\mathbb{Z}$, then $$(\rho | q \cdot \tilde{\rho}) \text{ and } (\tilde{\rho} | \tilde{q} \cdot \rho), \qquad \text{Eq. 21}$$

are bi-spanners of $[q \cdot \tilde{q}]^2$. Hence, by Fekete's lemma examples get:

$$\lim_{m \to \infty} \frac{\log_2 r_m}{m} \stackrel{(19)}{=} \lim_{m \to \infty} \frac{\log_2 z_m}{m} \stackrel{(20)}{=} \sup_m \frac{\log_2 z_m}{m}.$$

The limit in the last equation (which is the growth rate of both $(z_m)_m$ and $(r_m)_m$) will be denoted hereafter by $\mathfrak{R}$. Lower bounds, $z_m^*$, on the first few values of $z_m$, which were found by a computer search, are shown in table 300 of FIG. 3. In particular, examples get:

$$\mathfrak{R} \geq \frac{\log_2 115}{11} > 0.622, \qquad \text{Eq. 22}$$

Here, $\mathfrak{R}$ is strictly larger than the growth rate of $(\rho_m^+)_m$. In the next proposition the application shows that $\mathfrak{R}$ is also the growth rate of $(q_m)_m$.
Proposition 2.

$$\lim_{m \to \infty} \frac{\log_2 q_m}{m} = \mathfrak{R}$$

Proof any bi-scanner of $[q]^2$ over $\mathbb{Z}$, when taken modulo $q$, is a bi-spanner of $\mathbb{Z}_q^2$ over $\mathbb{Z}_q$. Therefore, $q_m \geq z_m$ and, so, $$\lim_{m \to \infty} \frac{\log_2 q_m}{m} \geq \lim_{m \to \infty} \frac{\log_2 z_m}{m} = \mathfrak{R} \qquad \text{Eq. 23}$$

Conversely, given $m \in \mathbb{Z}^+$, let $q = q_m$ and suppose that $\rho_1$ is a bi-spanner of $\mathbb{Z}_q^2$ of size $m$ over $\mathbb{Z}_q$. Examples can regard $\rho_1$ as an integer vector in $[q]^m$. Let $\rho_2$ be a smallest bi-spanner of $[m]^2$ over $\mathbb{Z}$ and let $v_m$ denote its size. Note that $v_m \leq 2\lceil \log_2 m \rceil$ (with equality attained when the bi-spanner is constructed simply). Accordingly, $$\rho = (\rho_1 | -q \cdot \rho_2), \qquad \text{Eq. 24}$$

is a bi-spanner of $[q]^2$ over $\mathbb{Z}$. Indeed, given any $(\xi^{(0)}, \xi^{(1)}) \in [q]^2$, there exist $a^{(0)}, a^{(1)} \in \mathbb{B}^m$ such that $$\xi^{(x)} = a^{(x)} \cdot \rho_1^T \text{ MOD } q, \, x \in \mathbb{B},$$

which means that there exist $\beta^{(0)}, \beta^{(1)} \in [m]$ such that $$\xi^{(x)} = a^{(x)} \cdot \rho_1^T - q \cdot \beta^{(x)}, \, x \in \mathbb{B}.$$

Since $\rho_2$ is a bi-spanner of $[m]^2$, there exist $b^{(0)}, b^{(1)} \in \mathbb{B}^{v_m}$ such that $$\beta^{(x)} = b^{(x)} \cdot \rho_2^T, x \in \mathbb{B}.$$

The last two equations imply that $\rho$ in Eq. 24 is a bi-spanner of $[q]^2$ of size $m+v_m$ over $\mathbb{Z}$. Hence, $q_m = q \geq z_{m+v_m}$ and, so, $$\varlimsup_{m\to\infty} \frac{\log_2 q_m}{m} = \varlimsup_{m\to\infty} \frac{\log_2 q_m}{m+v_m} \leq \lim_{m\to\infty} \frac{\log_2 z_{m+v_m}}{m+v_m} = \Re, \qquad \text{Eq. 25}$$

The result follows from Eq. 23 and Eq. 25.
Accordingly, examples can conclude that $$\Omega((3/2)^m) = \rho_m^+ \leq 1 + \lceil r_m/2 \rceil \leq z_m \leq q_m \leq 3^{m/2}$$

where the last inequality follows from a simple counting argument. In particular, $$\log_2(3/2) < 0.622 \leq \Re \leq (\log_2 3)/2 < 0.793$$

V. Single $L_1$-Error Correction in $\Sigma$-CAMs and $\Sigma$-TCAMs

This section describes the case $\tau=1$ (where there is at most one $L_1$-error in the whole array). This case corresponds to the parameters $(\tau_c, \tau_t)=(1,1)$ in Section II. The construction therein for $\Sigma$-CAMs yields a redundancy of approximately $1.26 \log_2 n$ (see Example 1), and the adaptation in Section III to $\Sigma$-TCAMs results in an increase of that redundancy by a factor of $3/2$ to approximately $1.89 \log_2 n$ (see Example 3).

This section presents a construction for $\Sigma$-CAMs with a redundancy of $m=\lceil \log_2(2n+1) \rceil$. A respective construction for $\Sigma$-TCAMs will have redundancy which is the smallest $m$ such that $q_m \geq 2n+1$. In particular, for sufficiently large $n$, this redundancy may be less than $1.607 \cdot \log_2(2n+1)$ (see Proposition 2 and Eq. 22).

Given a code length $n$, let $M=\lceil \log_2(2n+1) \rceil$, which will be the redundancy of the construction so that $k=n-m$. Let $$\alpha = (\alpha_j)_{j\in[n\rangle} = (\alpha'|\alpha'')$$

be a vector of code locators in $\mathbb{Z}^n$ (where $a' = (\alpha)_{[k\rangle}$ and $a'' = (\alpha)_{[k:n\rangle}$) that satisfies the following conditions.

i) The entries of $\alpha$ are nonzero elements in $[2n+1\rangle$.
ii) For any two distinct indexes $i, j \in [n\rangle$ (except when both are in $[k:n\rangle$):

$$\alpha_i \neq \alpha_j \text{ and } \alpha_i + \alpha_j \neq 2n+1$$

iii) $a'' = \omega_m = (12\,2^2 \ldots 2^{m-1})$.
Such vectors $\alpha$ can be constructed for every $n>4$.

The single-$L_1$-error-correction encoder, $\varepsilon_1: \mathbb{B}^k \to \mathbb{B}^n$, maps $a' \in \mathbb{B}^k$ to $a=(a'|a'') \in \mathbb{B}^n$ such that $$-a' \cdot (\alpha')^\top \text{ MOD } (2n+1) = a'' \cdot \omega_m^\top, \qquad \text{Eq. 26}$$

(i.e., $a''$ is the base-2 representation of the left-hand side of Eq. 26). Thus, the code that is induced by $\varepsilon_1$ is a subset of the following module over $\mathbb{Z}$:

$$\mathcal{M}_1 = \{c \in \mathbb{Z}^n : c \cdot \alpha^\top = 0\}$$

It follows that under conditions i)-iii), one can always correct any one change of $\pm 1$ occurring in the first $k$ coordinates in any vector in this module.

To adapt this scheme to $\Sigma$-CAMs, it suffices to require that $1_n \in \mathcal{M}_1$. This application shows that when $n>9$ is not a power of 2 (i.e., $n \neq 2^{m-2}$), this can always be achieved by properly selecting the code locators.

Examples start off by taking the code locators so that the entries of $a' = (\alpha_j)_{j \in [k\rangle}$ form the set $$\{\alpha_j\}_{j\in[k\rangle} = \{j+1\}_{j\in[n\rangle} \setminus (\{2^j\}_{j\in[m-1\rangle} \cup \{2n+1-2^{m-1}\})$$

and $a'' = (\alpha_j)_{j\in[k:n\rangle} = \omega_m$ (note that $2^{m-1} > n$, which, by condition (ii), requires $2n+1-2^{m-1}$ to be excluded from $a'$). Assuming that the entries of $a'$ are in increasing order, $a_{k-1}=n$, except when $n=2^{m-1}$, in which case $a_{k-1}=n-1$. Denote by $\mu_1$ the first moment (modulo $2n+1$) of the code locators:

$$\mu_1 = 1_n \cdot \alpha^\top \text{ MOD } (2n+1), \qquad \text{Eq. 27}$$

If $\mu_1 = 0$ examples are done (yet this rarely happens). By negating $a_{k-1} (\in \{n, n-1\})$ examples can get $\mu_1$ to be such that $$(\mu_1/2) \text{ MOD } (2n+1) \in [\lceil n/2 \rceil - 1, \lfloor 3n/2 \rfloor + 1],$$

in which case there exist $\Omega(k^2)$ index pairs $(i,j)$ such that $i$ and $j$ are distinct in $[k\rangle$ and $a_i + a_j = (\mu_1/2) \text{MOD}(2n+1)$. The first moment $\mu_1$ may then vanish modulo $2n+1$ when both $a_i$ and $a_j$ are negated. The $\Omega(k^2)$-term may be positive for every $n>9$.

Taking $n$ in the above construction to be odd and adding an extra parity bit examples can also detect two $L_1$-errors (corresponding to $(\tau, \sigma)=(1,1)$), and the extended module will contain the vector $1_{n+1}$.

The modification of the construction for vector-matrix multipliers for $\Sigma$-TCAMs is similar in spirit to what examples have done in Section II. Namely, examples change condition iii) to read:

iii) $*a'' = \rho$, where $\rho$ is a bi-spanner of $\mathbb{Z}_{2n+1}^2$ over $\mathbb{Z}_{2n+1}$.

Accordingly, m should be selected so that $q_m \geq 2n+1$ to guarantee such a bi-spanner. In order to detect two $L_1$-errors, examples use two extra bits to record the two possible values of the parity bit.

Example 5

Suppose that a single-$L_1$-error-correcting coding scheme is sought for a $\Sigma$-CAM with k=100. Examples can select the redundancy m to be the smallest so that $$2^m \geq 2n+1 = 2(k+m)+1 = 201+2m$$

This results in m=8.

For $\Sigma$-TCAMs, examples can select m to be the smallest so that $$q_m \geq 2n+1 = 2(k+m)+1 = 201+2m$$

Table 300 of FIG. 3 stops at smaller values of $q_m$, but examples can use the general recurrence for $(\rho_m^+)_m$ (which is Eq. 17 with equality therein) to obtain a feasible m and an explicit expression for $\rho$. Specifically, for m=12, 13, 14 examples get $p_m^+$=105, 158, 237, respectively. Accordingly, examples can take m=14 since $$q_{14} \geq \rho_{14}^+ = 237 \geq 229 = 201 + 2 \cdot 14$$

Alternatively, examples can use the super-multiplicativity from Eqs. 20 and 21. It can be seen from table 300 that $$z_{13} \geq z_2 \cdot z_{11} \geq 2 \cdot 115 = 230 \geq 227 = 201 + 2 \cdot 13$$

which means that examples can take m=13.

VI. Double $L_1$-Error Correction

This section describes the case $\tau=2$ (i.e., at most two $L_1$-errors in the whole array), which subsumes the scenario $(\tau_c, \tau_i)=(2,1)$ in the construction of Section II. As pointed out in Example 1, that construction for $\Sigma$-CAMs has a redundancy of approximately $2.52 \log_2 n$, whereas the construction in this section, has a redundancy of $2 \cdot \log_2 n + 0(1)$.

Let $p>3$ be a prime and define $n_1=(p-1)/2$, $m=[\log_2 p]$, $k=n_1-m$, $n_2=n_1+m$, and $n=n_2+1$. The (separable) coding scheme has dimension k, length n and, therefore, redundancy $n-k=2m+1$. For the construction examples can use a vector of code locators $a = (\alpha_j)_{j \in [n_1]}$ that satisfies conditions i)-iii) in Section V. This application defines $a^3 = (\alpha_j^3)_{j \in [n_1]}$. The encoding mapping, $\mathcal{E}_2: \mathbb{B}^k \to \mathbb{B}^n$, maps a vector $a' \in \mathbb{B}^k$ to a vector $a \in \mathbb{B}^n$ so that the following four conditions hold.

$$(a)_{[k\rangle} = a', \quad \text{Eq. 28}$$

$$(a)_{[n_1\rangle} \cdot a^\top \equiv 0 (\bmod p), \quad \text{Eq. 29}$$

-continued $$(a)_{[n_1\rangle} \cdot (a^{[3]})^\top \equiv (a)_{[n_1:n_2\rangle} \cdot \omega_m^\top (\bmod p), \quad \text{Eq. 30}$$

$$(a)_{[n_1:n\rangle} \cdot 1_{m+1}^\top \equiv 0 (\bmod 2), \quad \text{Eq. 31}$$

Eq. 29 is achieved by applying to a' the encoder $\mathcal{E}_1$ in Eq. 26 (with n therein replaced by $n_1=(p-1)/2$). Eq. 30 means that $(a)_{[n_1:n_2\rangle}$ forms the base-2 representation of $(a)_{[n_1\rangle} \cdot (a^{[3]})^T$ MOD p. Eq. 31 means that the last entry in a is the parity bit of $(a)_{[n_1:n_2\rangle}$. The induced code of $\mathcal{E}_2$ is a subset of the module, $\mathcal{M}_2$, over $\mathbb{Z}$ which consists of all vectors $c \in \mathbb{Z}^n$ that satisfy conditions Eq. 29-31 (when formulated with c instead of a). Here, it may be noted that $d(\mathcal{M}_2) \geq 5$, i.e., one can correct any pattern of up to two changes of $\pm 1$ occurring within the first k coordinates (possibly in the same coordinate) in any vector in $\mathcal{M}_2$.

As described in Section V, examples adapt a coding scheme for vector-matrix multipliers to $\Sigma$-CAMs by guaranteeing that $1_n$ belongs to $\mathcal{M}_2$. Repeating what we what was described in Section V, it can be assumed that a is such that there exist $\Omega(k^2)$ index pairs (i,j) such that i and j are distinct in $[k\rangle$ and $a_i+a_j=(\mu_1/2)$ MOD p, where $\mu_1$ is the first moment of the code locators, as defined in Eq. 27. Denoting the third moment of the code locators by $$\mu_3 = 1_n \cdot (a^{[3]})^\top \text{ MOD } p$$

it may be nonzero modulo p (along with a zero first moment). The following describes a method for obtaining such code locators.

Suppose that (i,j) and (i',j') are two of the above $\Omega(k^2)$ index pairs for which $$\alpha_i + \alpha_j \equiv \alpha_{i'} + \alpha_{j'} \equiv \mu_1/2 \,(\bmod p)$$

Examples may not be able to obtain $$\alpha_i^3 + \alpha_j^3 \equiv \alpha_{i'}^3 + \alpha_{j'}^3 \equiv \mu_3/2 (\bmod p)$$

This, in turn, may imply that for at least one of the pairs, say (i,j), the value of $\mu_1$ will become zero (modulo p) once examples negate $a_i$ and $a_j$, while $p_3$ may be nonzero. Indeed, otherwise there would be two distinct vectors in $\mathbb{Z}^n$ with $L_1$-norm 2 that would be in the same coset of the module $\mathcal{M}_2$: one that has 1s at the positions $\{i,j\}$ (and 0 otherwise) and the other that has 1s at positions $\{i',j'\}$. This, however, would mean that $d(\mathcal{M}_2) \leq 4$, which is a contradiction.

Assuming now that $\mu_3 \approx 0$, examples modify Eq. 30 in two ways. First, examples replace the vector $\Omega_m$ by the vector $\hat{\Omega}_m$ which is obtained by changing the last entry of $\Omega_m$ into $2^{m-1}-1$ (as shown in Eq 8). Secondly, examples multiply the right-hand side of Eq. 30 by the following constant $$\frac{\mu_3}{2^m - 2} \text{ MOD } p$$

which is (nonzero and) well defined, since $p>2^{m-1}$ and therefore p does not divide $2^{m-2}$. Thus, Eq. 30 becomes $$(2^m - 2) \cdot (a)_{[n_1]} \cdot (a^{[3]})^T \equiv \mu_3 \cdot (a)_{[n_1:n_2]} \cdot \hat{\omega}_m^T \pmod{p} \qquad 5$$

(compare with Eq. 8). It can be verified that the resulting module, $\hat{\mathcal{M}}_2$ is still 2-$L_1$-error-correcting and that $1_n$ satisfies Eq. 29 and Eq. 32. Moreover, when m is odd it also satisfies Eq. 31, in which case $1_n \in \hat{\mathcal{M}}_2$.

When m is even, examples can further modify the construction to have one more redundancy bit (i.e., set $n=n_2+2$) and replace Eq. 31 by, say, $$\begin{cases} a_{n_2} = a_{n_1} \\ (a)_{[n_1:n]} \cdot 1_{m+2}^T \equiv 0 \pmod{2} \end{cases}$$

(so that $1_n \in \hat{M}_2$).

In the case of Σ-TCAMs, the presently disclosed modification to the scheme for vector-matrix multipliers is similar to what was described in Sections III and V. Specifically, examples select m to be the smallest so that $q_m \geq 2n+1$. Examples set $$n_1 = \frac{p-1}{2},$$

$k=n_1-m$, $n_2=n_1+m$, and $n=n_2+2$. Examples also take a so that $(a)_{|k:n_1\rangle}$ is a bi-spanner, ρ, of $\mathbb{Z}_p^2$ over $\mathbb{Z}_p$ (see condition (iii) in Section V). Eqs. 28-31 now become, for each $x \in \mathbb{B}$:

$$\begin{aligned} (a^{(x)})_{[k]} &= (a^{(x)})' \\ (a^{(x)})_{[n_1]} \cdot a^T &\equiv 0 \pmod{p} \\ (a^{(x)})_{[n_1]} \cdot (a^{[3]})^T &\equiv (a^{(x)})_{[n_1:n_2]} \cdot \rho^T \pmod{p} \\ (a^{(x)})_{[n_1:n]} \cdot 1_{m+2}^T &\equiv 0 \pmod{2}, \end{aligned}$$

where $a^{(0)}$ and $a^{(1)}$ are non-intersecting (in particular, note that two bits are allocated for the parity in the last equation).

VII. Multiple $L_1$-Error Correction

This section describes the correction of an arbitrary number τ of $L_1$-errors.

Given the designed number of correctable $L_1$-errors τ, let $p>2\tau$ be a prime and define $n_1=(p-1)/2$ and $m=\lceil\log_2 p\rceil$. Also, let a be an integer vector in $\mathbb{Z}^n$ that satisfies conditions (i)-(iii) in Section V. For $i \in \mathbb{Z}^+$, denote by $a^{[i]}$ the integer vector $(\alpha_j^i)_{j \in [n_1]}$, and let $H_{Ber}=H_{Ber}(a, \tau)$ denote the τ×$n_1$ integer matrix whose rows are $a^{[2i+1]}$, $i \in [\tau]$. Namely, $H_{Ber}$, when seen as a matrix over $\mathbb{Z}_p$, is a parity-check matrix of a Berlekamp code $C_{Ber}$ over $\mathbb{Z}_p$. Let P be any τ×τ integer matrix such that $\det(P) \not\equiv 0 \pmod{p}$ and define the following module over $\mathbb{Z}$:

$$\mathcal{M}_{Ber} = \{c \in \mathbb{Z}^{n_1} : c \text{ MOD } p \in C_{Ber}\}$$
$$= c \in \mathbb{Z}^{n_1} : cH_{Ber}^T P \text{ MOD } p = 0\}$$

When $p>2\tau$, the minimum Lee distance of $C_{Ber}$ is known to be at least $2\tau+1$ and, so, =

$$d(\mathcal{M}_{Ber}) \geq 2\tau + 1, \qquad \text{Eq. 33}$$

The above holds also for any coset of $\mathcal{M}_{Ber}$ within $\mathbb{Z}^{n_1}$.

Let $\mathcal{E}_1 : \mathbb{B}^k \to \mathbb{B}^{n_1}$ be the encoder in Section V (with n therein replaced by $n_1$) and let $a=(a'|a'') \in \text{Im}(\mathcal{E}_1)$ (where $a' = (a)_{|k\rangle}$). Examples can compute the following syndrome vector $\tilde{s} \in [p]^\tau$ of a:

$$\tilde{s} = (\tilde{s}_v)_{v \in [\tau]} = aH_{Ber}^T P \text{ MOD } p$$

If, in addition, examples select P so that its first column is the standard unit vector $(100 \ldots)^T$, examples get (from $a \in \text{Im}(\mathcal{E}_1)$) that $\tilde{s}_0=0$. Examples can expand each entry $\tilde{s}_v$ in $\tilde{s}$ to its base-2 representation $s_v \in \mathbb{B}^m$:

$$\tilde{s}_v = s_v \cdot \omega_m^T, \qquad \text{Eq. 34}$$

Consider now an encoding mapping $\mathcal{E} : \mathbb{B}^{n_1} \to \mathbb{B}^{n_1+(\tau-1)m}$ defined by $$\varepsilon : a \mapsto (a|s), \qquad \text{Eq. 35}$$

where $$s = (s_1|s_2|\ldots|s_{\tau-1}) \in \mathbb{B}^{(\tau-1)m}.$$

If $y=\mathcal{E}(a)+e$ where $\|e\| \geq \tau$, then, from Eq. 33 and Proposition 1, examples can recover a' from y under the assumption that the (τ−1)m-suffix of y is error-free. This assumption can be guaranteed by applying to s a (second) encoder of a linear τ—$L_1$-error-correcting code of dimension (τ−1)m. Examples can continue this process recursively, but if examples just do (2τ+1)-fold repetition in the second step examples can end up with a total redundancy of $$\tau\lceil\log_2(2n+1)\rceil + O(\tau^2 \log_2(\tau \log_2 n)), \qquad \text{Eq. 36}$$

where n is the ultimate code length. Hence, for n large compared to r, most of the redundancy is due to the first encoding level.

To adapt this scheme to Σ-CAMs, examples select a as in Section VI and, as was done therein, examples replace the vector $\tilde{\Omega}_m$ in Eq. 34 by $\hat{\Omega}_m$. Consider the syndrome of the all-one vector in $\mathbb{Z}^{n_1}$:

$$\tilde{s} = 1_{n_1}(H_{Ber})^T P \text{ MOD } p$$

where the first column in P is the standard unit vector. Recalling that $$1_{n_1} \cdot \alpha^T \equiv 0 \pmod{p}, \text{ yet}$$

$$1_{n_1} \cdot (\alpha^{[3]})^T \not\equiv 0 \pmod{p},$$

it follows that $\tilde{s}_0 = 0$, yet $(\tilde{s})_{[1:\tau]} \not\approx 0$. By properly selecting P, examples can have $$(\tilde{s})_{[1:\tau]} = (2^m - 2) \cdot 1_{\tau-1},$$

in which case examples get that the image of $1_{n_1}$ under $\varepsilon$ in Eq. 35 is the all-one vector $1_{n_1+(\tau-1)m}$. This argument holds for any subsequent recursive encoding step and, in particular, when that step is just repetition. Thus, this application shows that under the choice of the parameters as in Section VI, the all-one vector is guaranteed to be a codeword of the induced code.

Comparing Eq. 36 with the redundancy of the construction in Section II, if examples substitute $\tau_c = \tau$ in Eq. 9, examples get in many cases values than are smaller than those obtained in Eq. 36 (even when $\tau_i > 1$). This is because of the 0(·) term in Eq. 36, which becomes non-negligible when $\tau$ is not sufficiently small compared to n.

Finally, for Σ-TCAMs, examples replace $w_m$ in Eq. 34 by a bi-spanner of $\mathbb{Z}_p^2$ over $\mathbb{Z}_p$.

VIII. Ordinary BCAMs and TCAMs

While this application deals with error correction schemes for Σ-CAMs and Σ-TCAMs, such schemes can be useful for the more ubiquitous BCAMs and TCAMs (which can be seen as Σ-CAMs/Σ-TCAMs where the integer sum of the outputs of the CAM cells along each column is replaced by the complement of their logical—"or"). By replicating each column 2τ+1 times examples can recover from any τ errors in the array, yet a with prohibitively large redundancy.

The error-correction problem for BCAMs has been addressed in several papers. A current proposed solution involves a hardware modification of the sense amplifiers along each match line: a "match" is redefined to mean that the (integer) sum of the outputs of the CAM cells along a column does not exceed a prescribed threshold t (thus, the modified device is in effect a quantized Σ-CAM; ordinary BCAMs correspond to t=0). In such a device, examples can encode the contents of each column, and respectively encode also the input vector, using a t-errorcorrecting binary code. The reading will then be the same/similar as that of an error-free BCAM, provided that the number of errors per column does not exceed t. As for TCAMs, it can be shown that this approach would require no less redundancy than a simple (2t+1)-fold repetition of the contents of each column (resulting in a prohibitive large redundancy).

FIG. 6 depicts an example CAM cell 600, in accordance with examples of the presently disclosed technology.

As alluded to above, CAMs can be categorized as "binary" or "ternary". A binary CAM ("BCAM")—composed of constituent BCAM cells—operates on an input pattern (and stores data) containing binary bits of "0" and "1". A ternary CAM ("TCAM")—composed of constituent TCAM cells—operates on an input pattern (and stores data) containing binary bits of "0", "1", and an "X" value. The "X" value is sometimes referred to as a "don't care" value or a "wildcard" value. In a search on the input pattern in a TCAM, an "X" will return a match on either a "0" bit or a "1". Thus, a search on the input pattern "10X1" will return a match for both "1001" and "1011."

As alluded to above, CAM-based circuits of the presently disclosed technology may utilize BCAMs/BCAM cells or TCAMs/TCAM cells depending on implementation.

CAM cell 600 illustrates an example of a 4 transistor-2 memristor (4T2M) TCAM cell that can be used in a CAM-based circuit of the presently disclosed technology. For example, CAM cell 600 may illustrate an example task-driven CAM cell programmed to store a task-driven value comporting with a computational task. CAM cell 600 may also illustrate an example redundancy CAM cell programmed to store a redundancy value.

As depicted, CAM cell 600 comprises a switching transistor T1 connected to a data line SL and a switching transistor T2 connected to an inverted data line $\overline{SL}$. As alluded to above, the voltages across data line SL and inverted data line $\overline{SL}$ may correspond with a value/entry (e.g., a voltage signal) of an input vector applied to a CAM of which CAM cell 600 is a part. For example, voltage across data line SL may correspond with the value/entry of the input vector (e.g., a logical one) while the voltage across the inverted data line $\overline{SL}$ may correspond with a negated version of the value/entry of the input vector (e.g., a logical zero). A memristor M2 is connected to switching transistor T1 and a memristor M1 is connected to switching transistor T2. As depicted, gate terminals of switching transistors T1 and T2 are connected to a word line WL—which biases switching transistors T1 and T2. Immediately prior to and during a searching/matching operation, the voltage of word line WL may be increased above a threshold value, activating switching transistors T1 and T2. When switching transistor T1 is activated, switching transistor T1 may provide an electrical connection between data line SL and memristor M2. By contrast, when switching transistor T1 is not activated (i.e., when the voltage across word line WL is lower than the threshold value), data line SL and memristor M2 may be electrically disconnected. Likewise, when switching transistor T2 is activated, switching transistor T2 may provide an electrical connection between inverted data line $\overline{SL}$ and memristor M1. By contrast, when switching transistor T2 is not activated (i.e., when the voltage across word line WL is lower than the threshold value), inverted data line $\overline{SL}$ and memristor M1 may be electrically disconnected. Accordingly, the inclusion of switching transistors T1 and T2 can ensure that memristors M1 and M2 are disconnected from the data lines of CAM cell 600 when searching/matching operations are not being performed, which can reduce overall power consumption for CAM cell 100.

As depicted, memristors M1 and M2 are connected in series to form a resistive divider 602. The output voltage of resistive divider 602 (i.e., the voltage on common node G) is applied to a gate of a match line-transistor T4 to control activation of match-line transistor T4. When match line-transistor T4 is activated, it may discharge (i.e., "pull-down") voltage of match line ML. For example, if the voltage applied to the gate of match line-transistor T4 exceeds a threshold value, match line-transistor T4 will activate and discharge (i.e., "pull-down") the voltage across match line ML—returning a mismatch. By contrast, when the voltage applied to the gate of match line-transistor T4 is less than or equal to the threshold value, match line-transistor T4 may not activate. Accordingly, match line-transistor T4 will not discharge (i.e., "pull-down") the voltage across match line ML—thus returning a match. While in the specific example of FIG. 6, "pull-down" logic is described, it should be understood that in other examples CAM cell 600 may implement "pull-up" logic instead.

As alluded to above, CAM cell 600 can be programmed to store a task-driven value or a redundancy value by programming conductance of memristors M1 and M2. While the programmed conductances of memristors M1 and M2 will generally remain the same unless re-programmed, the output voltage of resistive divider 602 (i.e., the voltage on common node G) will change based on the value of the voltages received by memristors M2 and M1 from data line SL and inverted data line $\overline{SL}$ respectively. For example, memristors M1 and M2 can be programmed to a first conductance state (e.g., a logical zero conductance state—which may correspond with a negated literal) that causes the output voltage of the resistive divider to be high (e.g., exceed a threshold value) when the voltages received from data line SL and inverted data line $\overline{SL}$ represent a logical one—thus activating match line transistor T4 and returning a mismatch when the voltages across data line SL and inverted data line $\overline{SL}$ represent a logical one. By contrast, memristors M1 and M2 can be programmed to a second conductance state (e.g., a logical one conductance state—which may correspond with a non-negated literal) that causes the output voltage of the resistive divider to be high (e.g., exceed a threshold value) when the voltages received from data line SL and inverted data line $\overline{SL}$ represent a logical zero—thus activating match line transistor T4 and returning a mismatch when the voltages across data line SL and inverted data line $\overline{SL}$ represent a logical zero. In various examples memristors M1 and M2 can be programmed to a third conductance state (e.g., a wildcard conductance state) that causes the output voltage of the resistive divider to remain low (e.g., below a threshold value) regardless of whether the voltages received from data line SL and inverted data line $\overline{SL}$ represent a logical zero or a logical one—thus ensuring match line transistor T4 remains un-activated, and returns a match when the voltages across data line SL and inverted data line $\overline{SL}$ represent a logical zero or a logical one.

As depicted, a service line transistor T3 can work in concert with switching transistor T1 and/or switching transistor T2 to program conductances of memristors M1 and M2 using a service line SX.

It should be understood that CAM cell 600 is just one example of a CAM cell that may be included in a CAM-based circuit of the present technology. In other implementations, CAM cell 600 may comprise a BCAM cell, or a TCAM cell of different configuration, such as a CMOS-based CAM cell, a six transistor-two memristor (6T2M) CAM cell, a 3 terminal CAM cells, a 16 transistor (16T) TCAM cell, etc.

Figure 7:
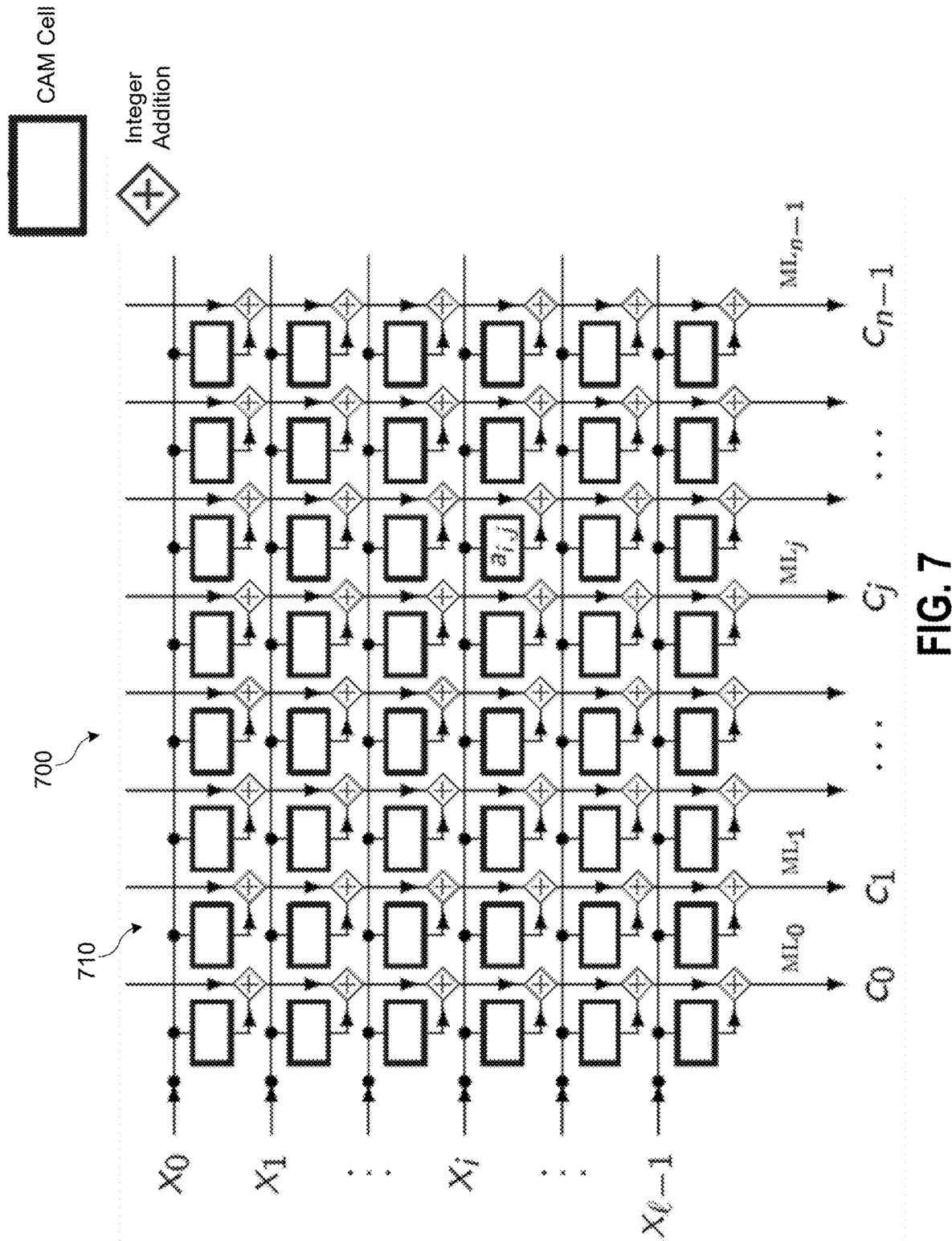
FIG. 7 depicts an example CAM-based circuit, in accordance with examples of the presently disclosed technology.

FIG. 7 depicts an example CAM-based circuit 700, in accordance with examples of the presently disclosed technology.

As depicted, CAM based circuit 700 may comprise a Σ-CAM 710, and one or more processing resources (not depicted for brevity) operative to program the CAM cells of Σ-CAM 710, and detect one or more errors in an output vector (c) from Σ-CAM 700. As depicted, the output vector (c) may be composed of constituent values $c_0$-$C_{n-1}$.

As described above, a Σ-CAM (sometimes referred to as Hamming-distance CAM) is a particular type of CAM configured to sum outputs from CAM cells arranged along a respective column. Said differently, a Σ-CAM may refer to a CAM which consists of an $\ell \times n$ array of CAM cells, with each CAM cell $(i,j) \in [\ell) \times [n)$ implementing the function $x \mapsto N(x, a_{i,j})$, for some internal state value $a_{i,j} \in \mathbb{B}$. Programmed internal states of the Σ-CAM can be represented as an array (matrix) $A = (a_{i,j})_{(i,j) \in [\ell) \times [n)} \in \mathbb{B}^{\ell \times n}$, with $a_i$ standing for row i and $A_j (=(A)_{\{j\}})$ for column j. An input to the Σ-CAM may comprise a row vector (e.g., search key) $x = (x_i)_{i \in [\ell)} \in \mathbb{B}^{\ell}$, with $x_i$ serving as the input to all the CAM cells along row i. A respective column (corresponding to a match line) j of the Σ-CAM can compute an integer sum of the outputs of the CAM cells arranged along the respective column j—i.e., $c_j = \Sigma_{i \in [\ell)} N(x_i, a_{i,j}) = w(x - A_j)$. These integer sums form the output row vector—i.e., $c = (c_j)_{j \in [n)} \in [0:\ell]^n$—of the Σ-CAM. Accordingly, the Σ-CAM computes the Hamming distances between the input vector and the contents of the CAM cells along each of the n columns in the Σ-CAM.

As an illustrative example, Σ-CAM 710 comprises a number (n) columns i.e., $column_0$ at the farthest left of FIG. 7 to $column_{n-1}$ at the farthest right of FIG. 7. Σ-CAM 710 also comprises a number (l) rows—i.e., $row_0$ at the top of FIG. 7 to $row_{l-1}$ at the bottom of FIG. 7.

For ease of reference, the CAM cell arranged along $column_0$ and $row_0$ may be referred to as CAM $cell_{0,0}$. Likewise, the CAM cell arranged along $column_{n-1}$ and $row_{l-1}$ may be referred to as CAM $cell_{n-1,l-1}$, and so on.

The constituent CAM cells of Σ-CAM 710 may comprises various types of CAM cells, including BCAM cells or TCAM cells (e.g., the example CAM cell 600 of FIG. 6).

As depicted, CAM cells arranged along a common row of Σ-CAM 710 are electrically connected along a common dataline. For example, the CAM cells of $row_0$ are electrically connected along a first data line, and accordingly may each receive an input value $x_0$. Likewise, the CAM cells of $row_{l-1}$ are electrically connected along an $I^{th}$ data line, and accordingly may each receive an input value $x_{l-1}$. Here, the input values $x_0$-$x_{l-1}$ may comprise constituent values of an input vector (x).

As depicted, CAM cells arranged along a common column of Σ-CAM 710 are electrically connected along a common match line. For example, the CAM cells connected along $column_0$ are electrically connected along match line $ML_0$. Likewise, the CAM cells connected along $column_{n-1}$ are electrically connected along match line $ML_{n-1}$.

As depicted (and as described above), Σ-CAM 710 may be configured to sum outputs from CAM cells arranged along a respective column. The final sum may be output by the match line associated with the respective column.

For example (and as described above in conjunction with FIG. 6), when a CAM cell (e.g., CAM cell 600) returns a mismatch, the CAM cell may be configured to pull-down voltage of the match line the CAM cell is connected to. Accordingly, Σ-CAM 710 can effectively sum/count the number of mismatches (or conversely, the number of matches) returned by CAM cells of a respective column by reading the final voltage output of the match line associated with the respective column.

Figure 8:
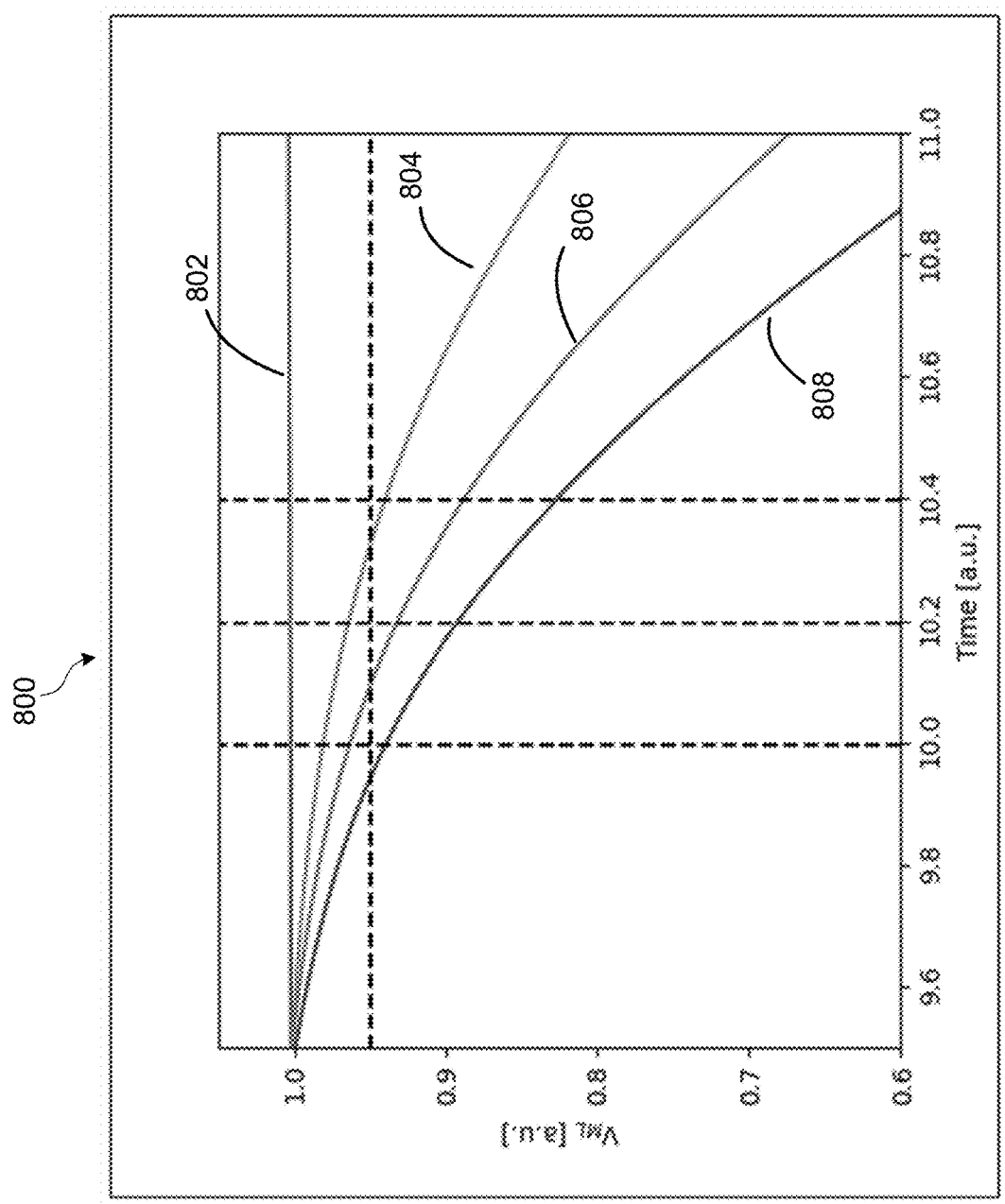
FIG. 8 depicts an example graph illustrating comparisons between a threshold voltage and voltage output of a match line associated with a column of CAM cells of a summing CAM, in accordance with examples of the presently disclosed technology

For concept illustration, FIG. 8 depicts an example graph 800 illustrating comparisons between a threshold voltage and voltage output of a match line associated with a respective column of Σ-CAM 710. As depicted, the threshold voltage is 0.9 a.u. volts and the match line voltage is compared to the threshold voltage at three discrete times: t=10.00 a.u., seconds; t=10.25 a.u., seconds; and t=10.50 a.u., seconds. If the match line returns three matches (as illustrated by curve 802), the match line voltage will exceed the threshold voltage three times. If the match line returns two matches (as illustrated by curve 804), the match line voltage will exceed the threshold voltage two times. If the match line returns one match (as illustrated by curve 806), the match line voltage will exceed the threshold voltage one time. If the match line returns zero matches (as illustrated by curve 808), the match line voltage will exceed the threshold voltage zero times. Here, the threshold voltage and the sensing/comparison times may be strategically selected to fit such a relationship.

As described above, CAM-based circuit 700 can detect and correct errors in Σ-CAM 710 while Σ-CAM 710 is performing a computational task (i.e., "on-access" error correction).

This "on-access" error correction methodology can improve upon "off-line" error detection/correction methodologies. Such "off-line" error detection/correction methodologies generally involve testing procedures which would disrupt normal operation of a hardware accelerator during a computational task, and thus must be performed "off-line." For example, an alternative methodology for detecting errors in a CAM could involve applying a sequence of test vectors to a CAM in order to detect programming and other circuit-based errors. Applying the test vectors may be unrelated to—and would otherwise disrupt—a computational task the CAM is being used to perform. Thus such a methodology would be performed "off-line." By contrast, CAM-based circuit 700 can correct an output vector generated by Σ-CAM 710 while Σ-CAM 710 is performing a designated computational task. Accordingly, such a methodology may be more computationally efficient (i.e., consume less processing resources, time, power consumption, etc.) than alternative "off-line" error detection and correction methodologies.

CAM-based circuit 700 realizes the advantages provided by "on-access" error detection and correction by leveraging an intelligent insight that a Σ-CAM (e.g., Σ-CAM 700) operates analogously to a vector-matrix multiplier (sometimes referred to as a dot product engine). Leveraging such insight, CAM-based circuit 700 can adapt an error-correction methodology for vector-matrix multipliers for Σ-CAMs. The adapted methodology involves adding redundancy columns to Σ-CAM 710. CAM-based circuit 700 can leverage one or more processing resources (e.g., an encoder) to compute redundancy values for the redundancy columns such that Σ-CAM 710 stores a codeword of a linear code (C) in each row. To further adapt the methodology for a new/particularized type of hardware accelerator—i.e., Σ-CAM 710—CAM-based circuit 700 can modify the linear code (C) used to compute redundancy values. Namely, CAM-based circuit 700 can modify the linear code (C) so that it includes the all-one vector. With this modification, CAM-based circuit 700 can detect and correct errors in the output vector (c) from Σ-CAM 710 based on this modified/particularized linear code (C).

For example (and as described above), CAM-based circuit 700 may comprise: a) Σ-CAM 710 comprising CAM cells arranged into the number (l) rows and the number (n) columns, wherein the Σ-CAM 710 is configured to sum outputs from a number (l) CAM cells connected along a respective column of the number (n) columns; and b) one or more processing resources (not depicted) operative to program the CAM cells to store a matrix (A) having dimensions (l×n), wherein: i) each row of the matrix (A) comprises a codeword of a linear code (C), and ii) the linear code (C) includes an all-one vector of dimension (n) as a codeword.

In Σ-CAM 710, CAM cells connected along a number (k) columns of the number (n) columns may comprise task-driven CAM cells. Relatedly, CAM cells connected along a number (n–k) columns of the number (n) columns may comprise redundancy CAM cells. Here, it follows that a respective row of Σ-CAM 710 comprises a number (k) task-driven CAM cells and a number (n–k) redundancy CAM cells. Accordingly, programming Σ-CAM 710 to store the matrix (A) having dimensions (l×n) may comprise: a) programming the number (k) task-driven CAM cells of the respective row to store task-driven values comporting with a computational task; b) computing redundancy values for the number (n–k) redundancy CAM cells of the respective row based on the programmed task-driven values and the linear code (C); and c) programming the number (n–k) redundancy CAM cells of the respective row to store the computed redundancy values such that the respective row stores a codeword of the linear code (C). In certain implementations, computing the redundancy values for the number (n–k) redundancy CAM cells of the respective row may comprise computing the redundancy values for the number (n–k) redundancy CAM cells of the respective row such that the task-driven values and the redundancy values include a sequence of ones and zeros prescribed by the linear code (C).

In CAM-based circuit 700, the one or more processing resources may be further operative to detect and correct one or more errors in the output vector (c) from Σ-CAM 710 based on the linear code (C). In certain of these implementations, the output vector (c) may have dimension (n). Relatedly, the output vector (c) may comprise a concatenation of a task-driven output vector (c') and a redundancy output vector (c"). Here, the task-driven output vector (c') may have dimension (k) and correspond to a summation between: (1) a vector-matrix multiplication between a transformation of an input vector (x) of dimension (l) received by Σ-CAM 710 and a task-driven stored matrix (A') of dimension (l×k) stored by the task-driven CAM cells of Σ-CAM 710; and (2) a vector multiplication between the all-one vector of dimension (n) and a constant value (see e.g., Eq. 4 above). Relatedly, the redundancy output vector (c") may have a dimension (n–k) and correspond to a summation between: (1) a vector-matrix multiplication between the transformation of the input vector (x) and a redundancy stored matrix (A") of dimension (l×k)) stored by the redundancy CAM cells of Σ-CAM 710; and (2) a vector multiplication between the all-one vector of dimension (n) and the constant value (see e.g., Eq. 4 above). Moreover, the one or more processing resources may detect and correct the one or more errors in the task-driven output vector (c') based on (e.g., by comparing) the linear code (C) and the redundancy output vector (c").

Figure 9:
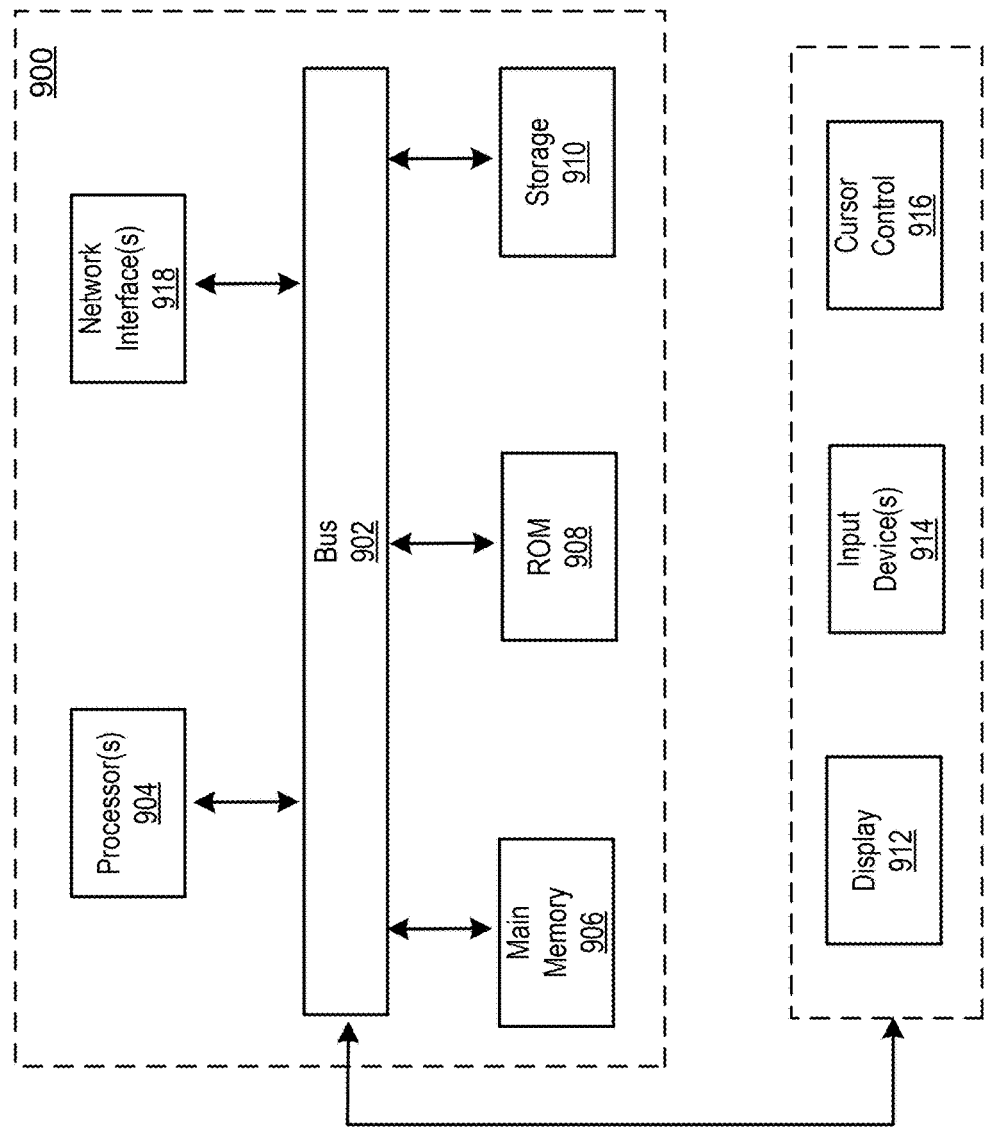
FIG. 9 depicts a block diagram of an example computer system in which various of the examples described herein may be implemented.

FIG. 9 depicts a block diagram of an example computer system 900 in which various of the examples described herein may be implemented. Computer system 900 may also be used to compute redundancy values and detect/correct errors in output vectors from Σ-CAMs (e.g., Σ-CAM 710).

The computer system 900 includes a bus 912 or other communication mechanism for communicating information, one or more hardware processors 904 coupled with bus 912 for processing information. Hardware processor(s) 904 may be, for example, one or more general purpose microprocessors.

The computer system 900 also includes a main memory 906, such as a random access memory (RAM), cache and/or other dynamic storage devices, coupled to bus 912 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 912 for storing static information and instructions for processor 904. A storage device 910, such as a magnetic disk, optical disk, or USB thumb drive (Flash drive), etc., is provided and coupled to bus 912 for storing information and instructions.

The computer system 900 may be coupled via bus 912 to a display 912, such as a liquid crystal display (LCD) (or touch screen), for displaying information to a computer user. An input device 914, including alphanumeric and other keys, is coupled to bus 912 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database", "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 190. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 912. Transmission media can also take the form of acoustic or light waves, such as those generated during radio-wave and infra-red data communications.

The computer system 900 also includes a communication interface 918 coupled to bus 912. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may", unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
   a summing content addressable memory (CAM) comprising CAM cells arranged into a number (l) rows and a number (n) columns, wherein the summing CAM is configured to sum outputs from a number (l) CAM cells connected along a respective column of the number (n) columns; and
   one or more processing resources operative to program the CAM cells to store a matrix (A) having dimensions (l×n), wherein:
   each row of the matrix (A) comprises a codeword of a linear code (C), and
   the linear code (C) includes an all-one vector of dimension (n) as a codeword.

2. The system of claim 1, wherein:
   CAM cells connected along a number (k) columns of the number (n) columns comprise task-driven CAM cells; and
   CAM cells connected along a number (n−k) columns of the number (n) columns comprise redundancy CAM cells such that the respective row of the summing CAM comprises a number (k) task-driven CAM cells and a number (n−k) redundancy CAM cells.

3. The system of claim 2, wherein programming the summing CAM to store the matrix (A) having dimensions (l×n) comprises:
   programming the number (k) task-driven CAM cells of the respective row to store task-driven values comporting with a computational task;
   computing redundancy values for the number (n−k) redundancy CAM cells of the respective row based on the programmed task-driven values and the linear code (C); and
   programming the number (n−k) redundancy CAM cells of the respective row to store the computed redundancy values such that the respective row stores a codeword of the linear code (C).

4. The system of claim 3, wherein computing the redundancy values for the number (n−k) redundancy CAM cells of the respective row based on the programmed task-driven values and the linear code (C) comprises:
   computing the redundancy values for the number (n−k) redundancy CAM cells of the respective row such that the task-driven values and the redundancy values include a sequence of ones and zeros prescribed by the linear code (C).

5. The system of claim 2, wherein the one or more processing resources are operative to:
   detect and correct one or more errors in an output vector (c) from the summing CAM based on the linear code (C).

6. The system of claim 5, wherein:
   the output vector (c) has dimension (n);
   the output vector (c) comprises a concatenation of a task-driven output vector (c') and a redundancy output vector (c");

the task-driven output vector (c') has dimension (k) and
corresponds to a summation between:
a vector-matrix multiplication between a transformation of an input vector (x) of dimension (l) received by the summing CAM and a task-driven stored matrix (A') of dimension (l×k) stored by the task-driven CAM cells of the summing CAM, and
a vector multiplication between the all-one vector of dimension (n) and a constant value;
the redundancy output vector (c") has a dimension (n−k) and corresponds to a summation between:
a vector-matrix multiplication between the transformation of the input vector (x) and a redundancy stored matrix (A") of dimension (l×(n−k)) stored by the redundancy CAM cells of the summing CAM, and
a vector multiplication between the all-one vector of dimension (n) and the constant value; and
detecting and correcting one or more errors in the output vector (c) from the summing CAM based on the linear code (C) comprises detecting and correcting the one or more errors in the task-driven output vector (c') based on the linear code (C) and the redundancy output vector (c").

7. The system of claim 1, wherein:
a respective CAM cell of the summing CAM comprises one or more programmable memristors; and
programming the respective CAM cell comprises programming conductance of the one or more programmable memristors.

8. A system comprising:
one or more processing resources operative to:
program a summing content addressable memory (CAM) to store a matrix (A) having dimensions (l×n), wherein:
each row of the matrix (A) comprises a codeword of a linear code (C), and
the linear code (C) includes an all-one vector of dimension (n) as a codeword; and
detect and correct one or more errors in an output vector (c) from the summing CAM based on the linear code (C).

9. The system of claim 8, further comprising the summing CAM.

10. The system of claim 9, wherein:
the summing CAM comprises CAM cells arranged into a number (l) rows and a number (n) columns; and
the summing CAM is configured to sum outputs from a number (l) CAM cells connected along a respective column of the number (n) columns.

11. The system of claim 10, wherein the one or more processing resources are operative to:
program a number (k) task-driven CAM cells of the respective row to store task-driven values comporting with a computational task;
compute redundancy values for a number (n−k) redundancy CAM cells of the respective row based on the programmed task-driven values and the linear code (C); and
program the number (n−k) redundancy CAM cells of the respective row to store the computed redundancy values such that the respective row stores a codeword of the linear code (C).

12. The system of claim 11, wherein computing the redundancy values for the number (n−k) redundancy CAM cells of the respective row based on the programmed task-driven values and the linear code (C) comprises:
computing the redundancy values for the number (n−k) redundancy CAM cells of the respective row such that the task-driven values and the redundancy values include a sequence of ones and zeros prescribed by the linear code (C).

13. The system of claim 11, wherein:
the output vector (c) has dimension (n);
the output vector (c) comprises a concatenation of a task-driven output vector (c') and a redundancy output vector (c");
the task-driven output vector (c') has dimension (k) and corresponds to a summation between:
a vector-matrix multiplication between a transformation of an input vector (x) of dimension (l) received by the summing CAM and a task-driven stored matrix (A') of dimension (l×k) stored by the task-driven CAM cells of the summing CAM, and
a vector multiplication between the all-one vector of dimension (n) and a constant value;
the redundancy output vector (c") has a dimension (n−k) and corresponds to a summation between:
a vector-matrix multiplication between the transformation of the input vector (x) and a redundancy stored matrix (A") of dimension (l×(n−k)) stored by the redundancy CAM cells of the summing CAM, and
a vector multiplication between the all-one vector of dimension (n) and the constant value; and
detecting and correcting one or more errors in the output vector (c) from the summing CAM based on the linear code (C) comprises detecting and correcting the one or more errors in the task-driven output vector (c') based on the linear code (C) and the redundancy output vector (c").

14. The system of claim 8, wherein:
a respective CAM cell of the summing CAM comprises one or more programmable memristors; and
programming the respective CAM cell comprises programming conductance of the one or more programmable memristors.

15. A method comprising:
programming a summing content addressable memory (CAM) to store a matrix (A) having dimensions (l×n), wherein:
each row of the matrix (A) comprises a codeword of a linear code (C), and
the linear code (C) includes an all-one vector of dimension (n) as a codeword; and
detect and correct one or more errors in an output vector (c) from the summing CAM based on the linear code (C).

16. The method of claim 15, wherein:
the summing CAM comprises CAM cells arranged into a number (l) rows and a number (n) columns; and
the summing CAM is configured to sum outputs from a number (l) CAM cells connected along a respective column of the number (n) columns.

17. The method of claim 16, wherein programming the summing CAM to store the matrix (A) having dimensions (l×n) comprises:
programing a number (k) task-driven CAM cells of the respective row to store task-driven values comporting with a computational task;
computing redundancy values for a number (n−k) redundancy CAM cells of the respective row based on the programmed task-driven values and the linear code (C); and programming the number (n–k) redundancy CAM cells of the respective row to store the computed redundancy values such that the respective row stores a codeword of the linear code (C).

18. The method of claim 17, wherein computing the redundancy values for the number (n–k) redundancy CAM cells of the respective row based on the programmed task-driven values and the linear code (C) comprises:
   computing the redundancy values for the number (n–k) redundancy CAM cells of the respective row such that the task-driven values and the redundancy values include a sequence of ones and zeros prescribed by the linear code (C).

19. The method of claim 17, wherein:
   the output vector (c) has dimension (n);
   the output vector (c) comprises a concatenation of a task-driven output vector (c') and a redundancy output vector (c");
   the task-driven output vector (c') has dimension (k) and corresponds to a summation between:
      a vector-matrix multiplication between a transformation of an input vector (x) of dimension (l) received by the summing CAM and a task-driven stored matrix (A') of dimension (l×k) stored by the task-driven CAM cells of the summing CAM, and
      a vector multiplication between the all-one vector of dimension (n) and a constant value;
   the redundancy output vector (c") has a dimension (n–k) and corresponds to a summation between:
      a vector-matrix multiplication between the transformation of the input vector (x) and a redundancy stored matrix (A") of dimension (l×(n–k)) stored by the redundancy CAM cells of the summing CAM, and
      a vector multiplication between the all-one vector of dimension (n) and the constant value; and
   detecting and correcting one or more errors in the output vector (c) from the summing CAM based on the linear code (C) comprises detecting and correcting the one or more errors in the task-driven output vector (c') based on the linear code (C) and the redundancy output vector (c").

20. The method of claim 15, wherein:
   a respective CAM cell of the summing CAM comprises one or more programmable memristors; and
   programming the respective CAM cell comprises programming conductance of the one or more programmable memristors.

* * * * *